(12) United States Patent
Elnekave et al.

(10) Patent No.: US 10,640,213 B2
(45) Date of Patent: May 5, 2020

(54) EJECTOR RACK

(71) Applicant: ISRAEL AEROSPACE INDUSTRIES LTD., Lod (IL)

(72) Inventors: David Elnekave, Mazkeret Batya (IL); Ilan Weissman, Lod (IL); Gil Melamed, Sdei Hemed (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/257,535

(22) Filed: Jan. 25, 2019

(65) Prior Publication Data

US 2019/0233108 A1     Aug. 1, 2019

(30) Foreign Application Priority Data

Jan. 28, 2018   (IL) .......................................... 257196

(51) Int. Cl.
| | |
|---|---|
| *B64D 1/04* | (2006.01) |
| *B64D 1/06* | (2006.01) |
| *F41F 5/00* | (2006.01) |
| *B64D 37/12* | (2006.01) |

(52) U.S. Cl.
CPC ................. *B64D 1/04* (2013.01); *B64D 1/06* (2013.01); *B64D 37/12* (2013.01); *F41F 5/00* (2013.01)

(58) Field of Classification Search
CPC ........................................................ B64D 1/04
USPC ............. 89/1.51, 1.53, 1.52, 1.58; 244/137.4
See application file for complete search history.

(56) References Cited

U.S. PATENT DOCUMENTS

| | | | |
|---|---|---|---|
| 3,524,381 A | 8/1970 | Miller | |
| 4,050,656 A | 9/1977 | Peterson | |
| 8,584,505 B2 | 11/2013 | Penth et al. | |
| 2014/0216236 A1* | 8/2014 | McMahon | ................ F41F 5/00 89/1.59 |

FOREIGN PATENT DOCUMENTS

| | | |
|---|---|---|
| GB | 2414782 A | 12/2005 |
| WO | 2016199132 A1 | 12/2016 |

* cited by examiner

*Primary Examiner* — Reginald S Tillman, Jr.
(74) *Attorney, Agent, or Firm* — Dorsey & Whitney LLP

(57) ABSTRACT

The presently disclosed subject matter is directed to devices for carrying and releasing stores from a vehicle, such as ejector racks for carrying and releasing a store with respect to an air vehicle.

19 Claims, 14 Drawing Sheets

EJECTOR RACK

TECHNOLOGICAL FIELD

The presently disclosed subject matter relates to devices for carrying and releasing stores from a vehicle, in particular to ejector racks for carrying and releasing a store with respect to an air vehicle. The presently disclosed subject matter in particular relates to ejector racks that are actuated using pressurized gas.

BACKGROUND ART

References considered to be relevant as background to the presently disclosed subject matter are listed below:
GB 2,414,782
U.S. Pat. No. 4,050,656
WO 2016/199132
Acknowledgement of the above references herein is not to be inferred as meaning that these are in any way relevant to the patentability of the presently disclosed subject matter.

BACKGROUND

Stores, such as for example bombs and missiles, are commonly carried by air vehicles, with a requirement to enable the stores to be released when required by the pilot or other aircrew. Conventionally, such carrying and release functions are provided by devices for carrying and releasing stores, typically in the form of ejector racks, in which actuation thereof to release the stores is by ignition of gas cartridges to provide a pressurized gas.

By way of non-limiting example, GB 2,414,782 discloses an ejector release system for an aircraft-mounted store, which comprises a reservoir for containing a pre-charged gaseous ejection medium, an actuation cylinder connected to the reservoir for effecting ejection of the store and a control valve between the reservoir and actuation cylinder, in which a snap-action pressure relief valve is mounted between the control valve and cylinder to allow excess pressure in the system downstream of the reservoir to be vented or diverted when the pressure exceeds a predetermined threshold pressure. The pressure relief valve may include a piston which is stepped to define an annular shoulder between larger and smaller diameter parts the shoulder constituting a marginal surface area which causes the piston to be urged towards the forwards position under gas input pressure, a vent passage which is out of registration with the inlet and outlet passages at the rearwards position of the piston but is in registration in the forwards position being provided in the piston. One or more resiliently-loaded balls urged into engagement with a corresponding detent formed in the piston in the rearwards or pressure-retaining position provide the snap action.

Further by way of non-limiting example, U.S. Pat. No. 4,050,656 discloses an ejector rack that is attachable to an aircraft and is for supporting and selectively releasing and/or ejecting a store that is carried internal of the aircraft, i.e., in a bomb bay. The store can be released from the ejector rack, and from the aircraft, in either of two ways, namely: by pushing on a manually operated release handle; or, by forced ejection, the only way used during flight of the aircraft. Forced ejection is achieved by sending an electrical impulse to either or both of two cartridges in the breech of the ejector rack, igniting the cartridge(s). Gas is generated thereby; and, the resultant pressure that is built up in a gas system in the rack provides force that acts upon an unlocking piston, causing the piston to move out of its "locked" position. In turn, the moving piston provides a force on a slide, rotating a latch that allows the main linkage bellcrank to rotate and thus to open two hooks which are holding the store, thereby releasing the suspended store. Concurrently, gas pressure is manifolded to two sway brace ejection piston cylinders, and the ejection pistons therein are forcefully extended, causing positive and forcible ejection of the store by the ejection pistons.

GENERAL DESCRIPTION

According to a first aspect of the presently disclosed subject matter, there is provided a support and release device for releasably supporting a store, the store having at least one lug for enabling selective removable engagement of the store with respect to the device, the device comprising a housing accommodating:
  a lug engagement release system, comprising a hook element;
  an actuator system, operatively coupled to the lug engagement release system; and
  a safety system comprising a safety lock, said safety lock being configured for selectively coupling or uncoupling with respect to at least the lug engagement release system to alternately provide a coupled mode and a decoupled mode, respectively,
wherein:
the lug engagement release system is configured for alternately providing:
    an engaged configuration, in which the lug engagement release system is, or can be engaged, i.e. is capable of being in an engaged relationship, with respect to the lug via said hook element, and
    a disengaged configuration, in which the lug engagement release system is selectively disengaged with respect to the lug, responsive to selective operation of the actuator system wherein the actuator system selectively provides pressurized gas to said lug engagement release system, concurrent with the safety lock being in uncoupled mode;
wherein:
  in the coupled mode the safety lock is coupled with respect to the lug engagement release system such as to prevent the lug engagement release system, in the engaged configuration, from providing the disengaged configuration, irrespective of operation of the actuator system; and
  in the decoupled mode the safety lock is decoupled with respect to the lug engagement release system enabling the lug engagement release system to provide the disengaged configuration from the engaged configuration responsive to operation of the actuator system;
  and wherein the safety system is configured for enabling venting of the pressurized gas from the actuator system to an external environment under conditions where the actuation system is operated concurrent with the safety lock being in coupled mode.

For example, said actuator system comprises a fluid conduit connectable to a pressurized gas source, the pressurized source configured for providing pressurized gas to said lug engagement release system during operation of said device, and wherein said safety system comprises a venting arrangement configured for providing fluid communication between said fluid conduit and the external environment when the safety lock is in said coupled mode, and to prevent fluid communication between said fluid conduit and the external environment when the safety lock is in uncoupled mode. Additionally, for example, said actuator system comprises an actuation piston reciprocably mounted with respect a cylinder, the cylinder being in fluid communication with said fluid conduit, the piston being displaceable with respect to the cylinder responsive to said pressurized gas being applied to the piston and concurrent with the safety lock being in uncoupled mode. Additionally, for example, the piston is operatively coupled to the lug engagement release system, such that as the piston is displaced with respect to the cylinder between a first position and a second position, the lug engagement release system goes from the engaged configuration to the disengaged configuration.

Additionally or alternatively, for example, said safety system comprises a venting arrangement comprising at least one fluid venting conduit, each said fluid venting conduit having at least one inlet in selective fluid communication with said fluid conduit, and at least one outlet in selective fluid communication with the external environment.

Additionally, for example, for at least one said fluid venting conduit, and concurrent with the safety lock being in said coupled mode, the respective said at least at least one inlet is in free fluid communication with said fluid conduit and at least one outlet is in selective fluid communication with the external environment.

Additionally or alternatively, for example, for the respective at least one said fluid venting conduit, and concurrent with the safety lock being in said uncoupled mode there fluid communication is prevented between said at least at least one inlet and said fluid conduit.

Additionally or alternatively, for example, for the respective said at least one said fluid venting conduit, and wherein concurrent with the safety lock being in said uncoupled mode fluid communication is prevented between said at least one outlet and the external environment.

Additionally or alternatively, for example, the respective said fluid venting conduit, the respective said at least one inlet, and the respective at least one outlet are provided in said piston, and wherein said cylinder comprises at least one cylinder opening corresponding to each said outlet. Additionally, for example, said cylinder openings are located on the cylinder at respective positions such as to be in registry with said outlet openings when said piston is at or close to said first position thereby providing is free fluid communication between the external environment and the fluid conduit, via the fluid venting conduit and cylinder openings.

Additionally or alternatively, for example, said cylinder openings are located on the cylinder at respective positions such as not to be in registry with the outlet openings when the piston has moved significantly away from said first position in a direction towards said second position, and until said second position to thereby block fluid communication between external environment and the fluid conduit.

Additionally or alternatively, for example, said venting arrangement further comprises a plunger member reciprocably mounted with respect to plunger casing, the plunger member being reciprocably displaceable with respect to the plunger casing between a nominal first plunger position and a second plunger position. Additionally, for example, a second said fluid venting conduit, a respective second said at least one inlet, and a respective second at least one outlet are provided in said plunger member, and wherein said plunger casing comprises at least one casing opening corresponding to each said second outlet. Additionally, for example, said casing openings are located on the plunger casing at respective positions such as to be in registry with said second outlet openings when said plunger member is at or close to said first plunger position thereby providing is free fluid communication between the external environment and the fluid conduit, via the second fluid venting conduit and casing openings. Additionally or alternatively, for example, said casing openings are located on the plunger casing at respective positions such as not to be in registry with the second outlet openings when the plunger member has moved significantly away from said first plunger position in a direction towards said second plunger position, and until said second position to thereby block fluid communication between external environment and the second fluid conduit.

Additionally or alternatively, for example, said plunger member comprises a plunger head and lower projection.

Additionally or alternatively, for example, the venting arrangement further comprises a biasing spring that biases the plunger member in a direction towards an extraction axis of the safety lock.

Additionally or alternatively, for example, in said first plunger position, and an upper end of said plunger member projects out of the plunger casing and into the fluid conduit, such as to allow free fluid communication between the second said inlets and the fluid conduit. Additionally, for example, in said second plunger position, the upper end is retracted into the plunger casing, thereby sealing off the plunger casing from the fluid conduit, and such as to prevent fluid communication between the second said inlets and the fluid conduit.

In at least another example, for example, said venting arrangement comprises a plunger member reciprocably mounted with respect to plunger casing, the plunger member being reciprocably displaceable with respect to the plunger casing between a nominal first plunger position and a second plunger position. Additionally, for example, said fluid venting conduit, said at least one inlet, and said at least one outlet are provided in said plunger member, and wherein said plunger casing comprises at least one casing opening corresponding to each said second outlet. Additionally, for example, said at least one outlet are provided in said plunger member such as to be in registry with said outlet openings when said plunger member is at or close to said first plunger position thereby providing is free fluid communication between the external environment and the fluid conduit, via the fluid venting conduit and said casing openings.

Additionally or alternatively, for example, said casing openings are located on the plunger casing at respective positions such as not to be in registry with the outlet openings when the plunger member has moved significantly away from said first plunger position in a direction towards said second plunger position, and until said second position to thereby block fluid communication between external environment and the fluid conduit.

Additionally or alternatively, for example, said plunger member comprises a plunger head and lower projection.

Additionally or alternatively, for example, the venting arrangement further comprises a biasing spring that biases the plunger member in a direction towards an extraction axis of the safety lock.

Additionally or alternatively, for example, in said first plunger position, and an upper end of said plunger member projects out of the plunger casing and into the fluid conduit, such as to allow free fluid communication between the said inlets and the fluid conduit. Additionally, for example, in said second plunger position, the upper end is retracted into the plunger casing, thereby sealing off the plunger casing from the fluid conduit, and such as to prevent fluid communication between the said inlets and the fluid conduit.

Additionally or alternatively, for example, the device is further configured for selectively ejecting forcibly the store therefrom, the device comprising an ejector system comprising at least one ejection module, each ejection module configured for providing an ejection force generated under action of gas pressure provided by the actuation system. Additionally, for example, each ejection module comprising a tubular housing accommodating a telescopic plunger element comprising an end wall at a first longitudinal end thereof having a small opening, the telescopic plunger element being closed at a second longitudinal end thereof. Additionally, for example, said second longitudinal end comprises a padded abutment element, configured for abutting against the stores when this is engaged with the device.

Additionally or alternatively, for example, the device further comprises at least one sway braces.

Additionally or alternatively, for example, said lug engaging and releasing mechanism comprises a first kinematic chain and a second kinematic chain. Additionally, for example, said first kinematic chain comprises a first stressed link, a coupling plate, a first link, and said hook element. Additionally, for example, said second kinematic chain comprises an anvil member, a second link, a pivoting member, and a second stressed link. Additionally, for example, said coupling plate and said anvil member are pivotable mounted to said housing coaxially about a pivot axis.

According to a second aspect of the presently disclosed subject matter, there is provided an air vehicle comprising at least one support and release device as defined in herein regarding the first aspect of the presently disclosed subject matter.

According to a third aspect of the presently disclosed subject matter, there is provided a method for releasably supporting a store, the store having at least one lug, the method comprising:
 (a) providing at least one support and release device as defined in herein regarding the first aspect of the presently disclosed subject matter; and
 (b) engaging the lug with respect to the lug engagement release system to thereby urge the lug engagement release system to the engaged configuration;
 (c) coupling the safety lock with respect to the device to provide the coupled mode.

For example, the method further comprises:
 (d) decoupling the safety lock with respect to the device to provide the decoupled mode;
 (e) selectively operating the actuator system to thereby actuate said lug engagement release system to enable the lug engagement release system to adopt the disengaged configuration, thereby enabling the lug engagement release system to release the lug therefrom.

A feature of at least one example of the presently disclosed subject matter is that a support and release device can be designed to cope with a design condition in which the pressure within the actuator system, in particular the fluid conduit thereof, begins to increase, for example as a result of the actuation system being actuated (either by accident or because of a malfunction, for example). In such a design condition, the safety system can provide an escape for the gas pressure, which otherwise (i.e., under alternative conditions in which the safety system is absent or non-operational) would increase, for example to the actuation pressure or greater.

Another feature at least one example of the presently disclosed subject matter is that the safety system can prevent the pressure within the actuator system, in particular the fluid conduit thereof, from reaching the actuation pressure and in particular from significantly exceeding the increasing actuation pressure, and thus enables the housing to be designed with a considerably reduced safety margin, as regards capability for holding large internal pressure, as could otherwise be required under such alternative conditions.

Another feature at least one example of the presently disclosed subject matter is that the safety system can be configured such that at the aforementioned design condition, shortly after such an event of the actuation system being actuated while the safety lock is concurrently in coupled mode, the pressure within the fluid conduit of the actuator system causes full displacement of the piston to be resisted by the lug engagement release system, which in turn is effectively locked by the safety lock when in coupled mode.

Another feature at least one example of the presently disclosed subject matter is that the safety system can be configured such that at the aforementioned alternative conditions with the safety lock in coupled mode could otherwise result in excessive pressure buildup within the actuator system.

Another feature at least one example of the presently disclosed subject matter is that the safety system can be configured such that at the aforementioned alternative conditions with the safety lock in coupled mode could otherwise result in excessive loads being applied to the hook element (and therefrom to the stores) and/or excessive loads being applied to the stores via the ejector system.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
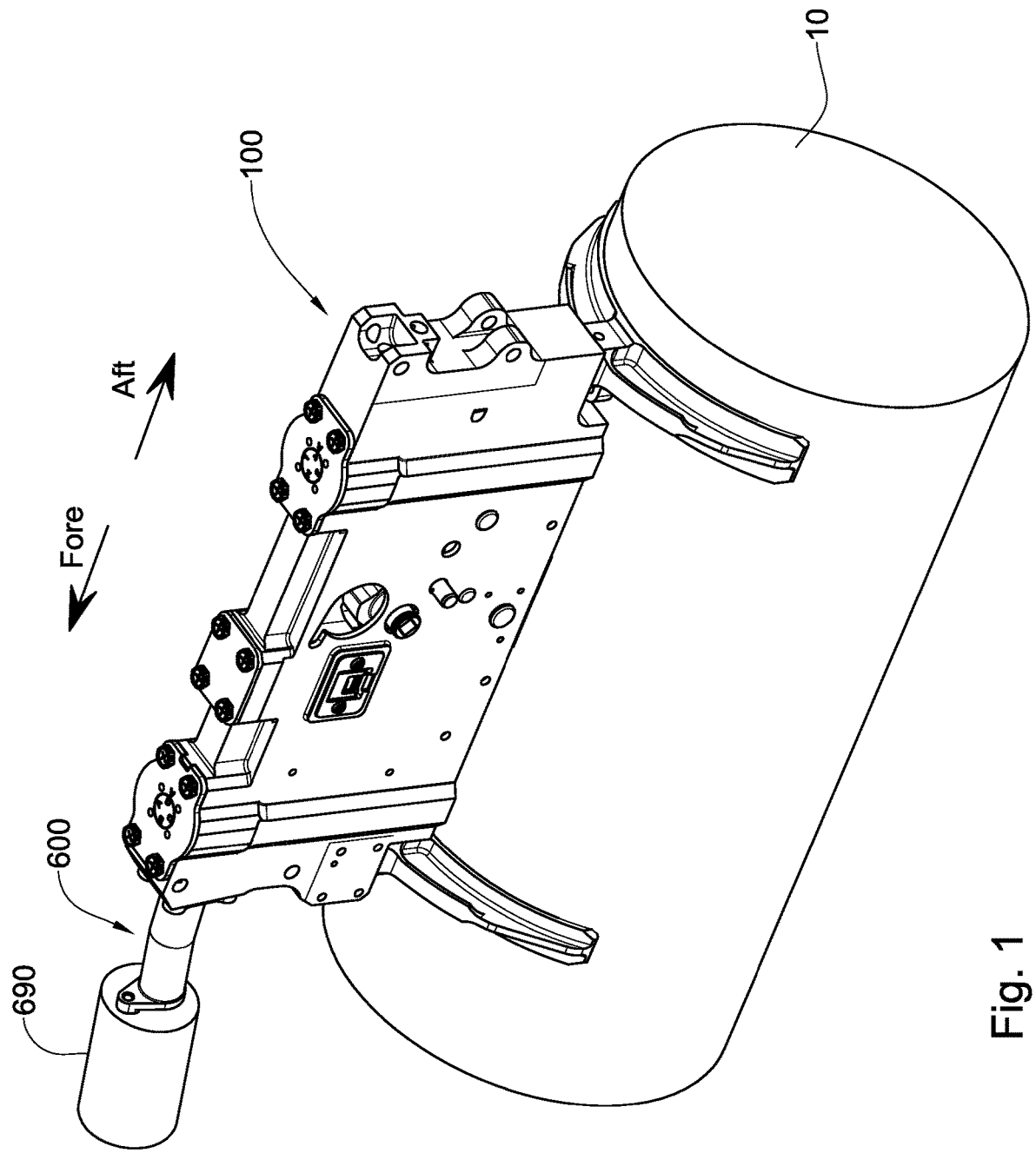
FIG. 1 shows in aft/top/side isometric view a support and release device according to a first example of the presently disclosed subject matter, in engaged configuration with a store.

Referring to FIGS. 1 to 5 a support and release device (also referred to interchangeably herein as a suspension and release device, and/or also referred to interchangeably herein as a carrying and release device) according to a first example of the presently disclosed subject matter, generally designated 100, comprises a lug engagement release system 300, actuation system 600, and safety system 700 comprising safety lock 799.

As will become clearer herein, the lug engagement release system 300 is operatively coupled to actuator system 600.

Also as will become clearer herein, the safety lock 799 is configured for selectively, and alternately, coupling and decoupling with respect to at least the lug engagement release system 300 to provide a coupled mode and a decoupled mode, respectively.

Furthermore the lug engagement release system 300 is configured for:
  selectively engaging a lug (for example, of a store) in an engaged configuration; and
  selectively disengaging the lug from the engaged configuration to provide a disengaged configuration (the disengaged configuration allowing for release of the store) in response to selective actuation of lug engagement release system 300 via the actuator system 600, concurrently with the safety lock 799 being in decoupled mode.

Also as will become clearer herein:
  when the safety lock 799 is in coupled mode, the lug engagement release system 300 is locked and is thereby prevented from going from the engaged configuration to the disengaged configuration, irrespective of operation of the actuator system 600; and
  when the safety lock 799 is in decoupled mode, the lug engagement release system 300 is thereby unlocked and is thereby enabled to go from the disengaged configuration to the engaged configuration responsive to operation of the actuator system 600.

Also as will become clearer herein, the actuator system 600 is configured for being actuated based on an actuation pressure AP being applied thereto, and safety system 700 is configured for preventing said actuation pressure AP being applied to the actuator system 600 when the safety lock 799 is in coupled mode.

In the Figures, the directional designations "Fore", "Aft", "Side", "Up" and "Down" are shown, together with an arrow for each designation, to facilitate comprehension. Referring to an orthogonal axes system (x-y-z), the fore and aft directions are parallel to a longitudinal axis "x"; the side directions are parallel to the lateral axis "z"; the up and down directions are parallel to the vertical axis "y". However, it is to be noted that the above directional designations are for ease of comprehension and are not necessarily limiting.

The support and release device 100 finds particular application in the form of an ejector rack (and is thus interchangeably referred to herein as an ejector rack, or as a stores ejector rack, or as a rack), for carrying a store, on or in an air vehicle, and in particular for releasably supporting such a store. According to a first aspect of the presently disclosed subject matter, the support and release device 100 is configured for carrying the store in suspended configuration, and for selectively releasing the store from the air vehicle.

For example, such a store can be a bomb, missile, rocket, external fuel tank, and so on, and an example thereof is illustrated in FIG. 1 and designated with the reference numeral 10. The store 10 is in any case characterized in being equipped with at least one lug 15 (FIG. 4), by which the store 10 is releasably engaged to and suspended from, i.e., with respect to, the device 100. In this example, the store 10 has a single lug 15, and thus the device 100 only requires a single lug engagement release system 300, as will become clearer herein. However, in alternative variations of this example, the store may instead have several lugs, and the support and release device can correspondingly comprise a similar number of lug engagement release system 300, for example.

For the purpose of facilitating comprehension of the presently disclosed subject matter, an example of engagement release mechanism 300, which is per se novel, is disclosed below.

Figure 2:
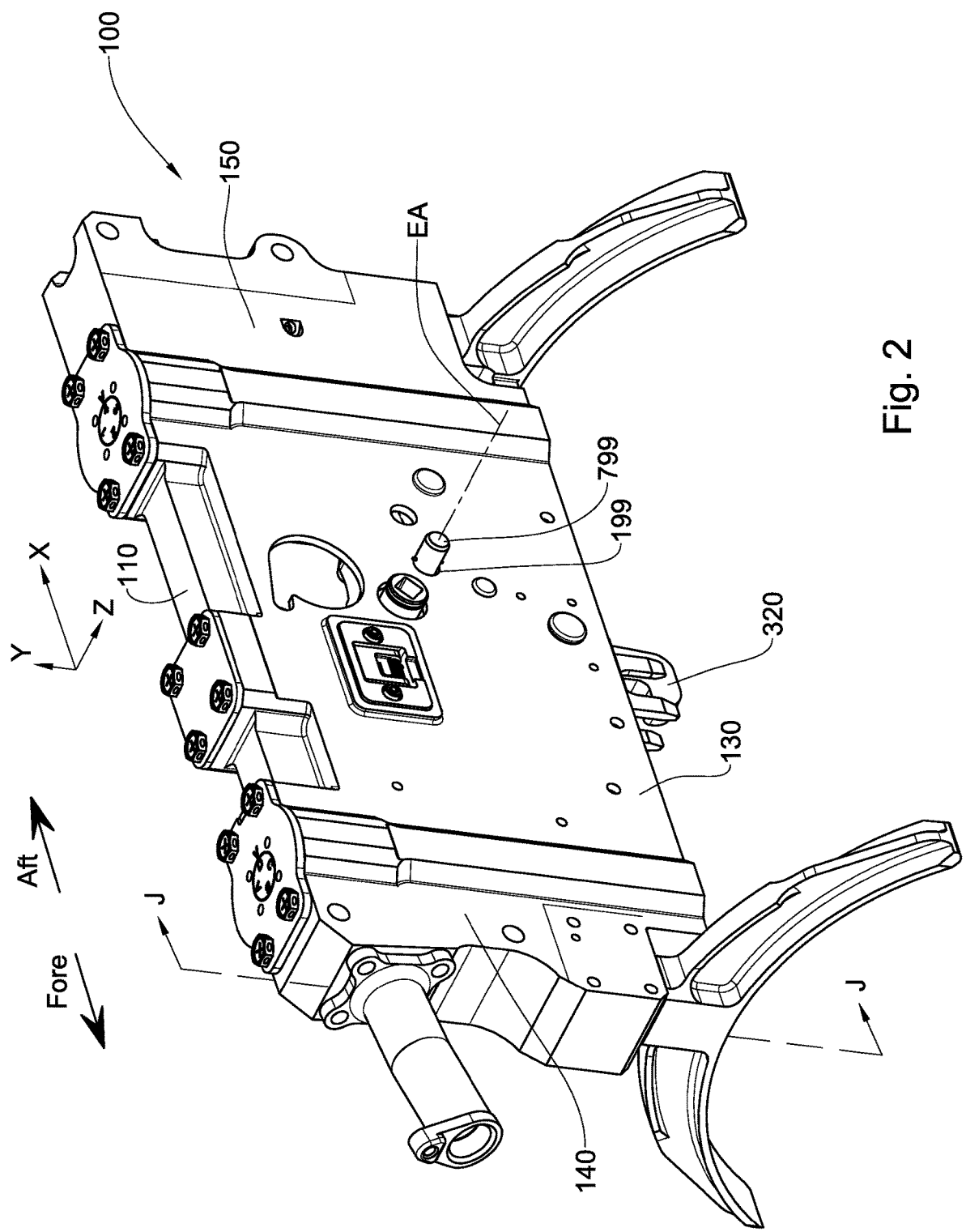
FIG. 2 shows in front/top/side isometric view the example of FIG. 1 with the store removed.
Figure 3:
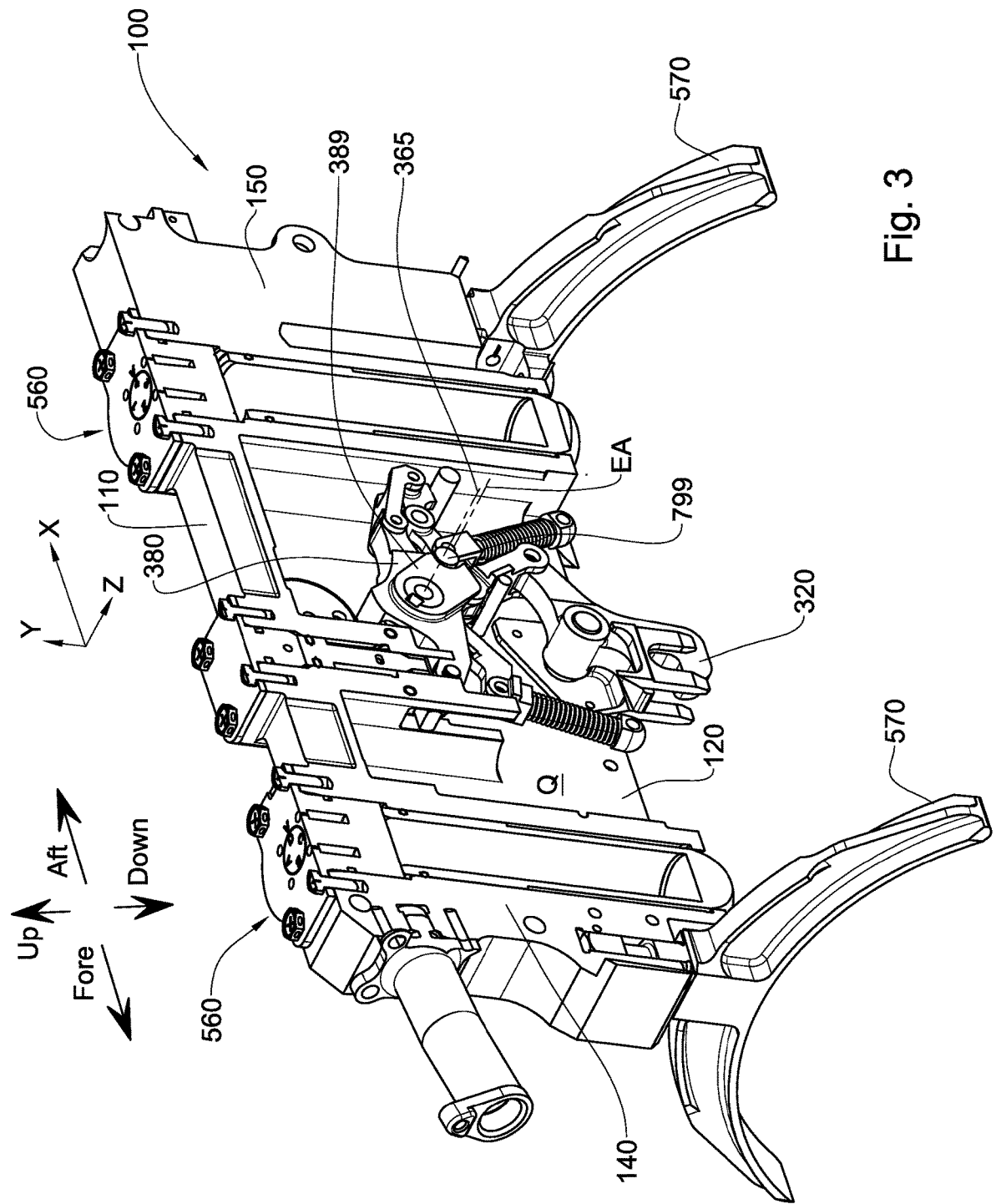
FIG. 3 shows in front/top/side isometric cross-sectional view the example of FIG. 2.

Referring in particular to FIGS. 2 and 3, the device 100 comprises a housing 110, including two parallel laterally spaced side plates (also referred to interchangeably herein as side walls or side panels) 120, 130, integrally connected at the forward longitudinal ends thereof to forward end block 140 and aft end block 150, respectively to form a box-like structure. In alternative variations of this example, the two parallel laterally spaced side plates 120, 130, are otherwise non-integrally connected at the forward longitudinal ends thereof to forward end block 140 and aft end block 150, respectively, for example via welding, screws or other fasteners, to form the box-like structure.

A bottom plate (not shown) can optionally be provided between the lower edges of the two side plates 120, 130, having an opening in registry with hook element 320, to enable a lug 15 of the store (not shown in FIGS. 2 and 3) to be inserted from outside the device 100 into the space Q between the side plates 120, 130 and engage vertically with hook element 320.

Figure 4:
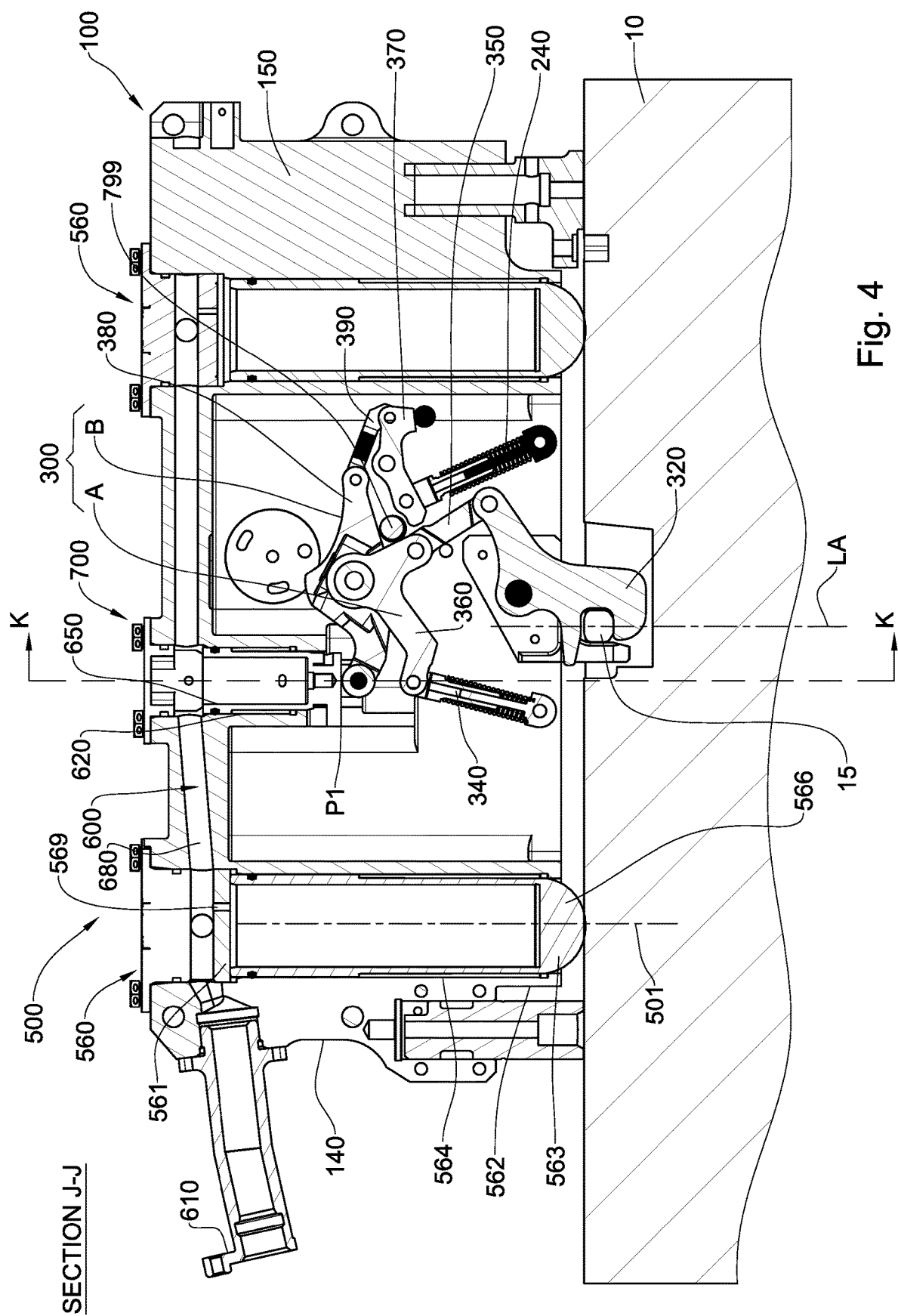
FIG. 4 shows in transverse cross-sectional view the example of FIG. 2, taken along section J-J.
Figure 5:
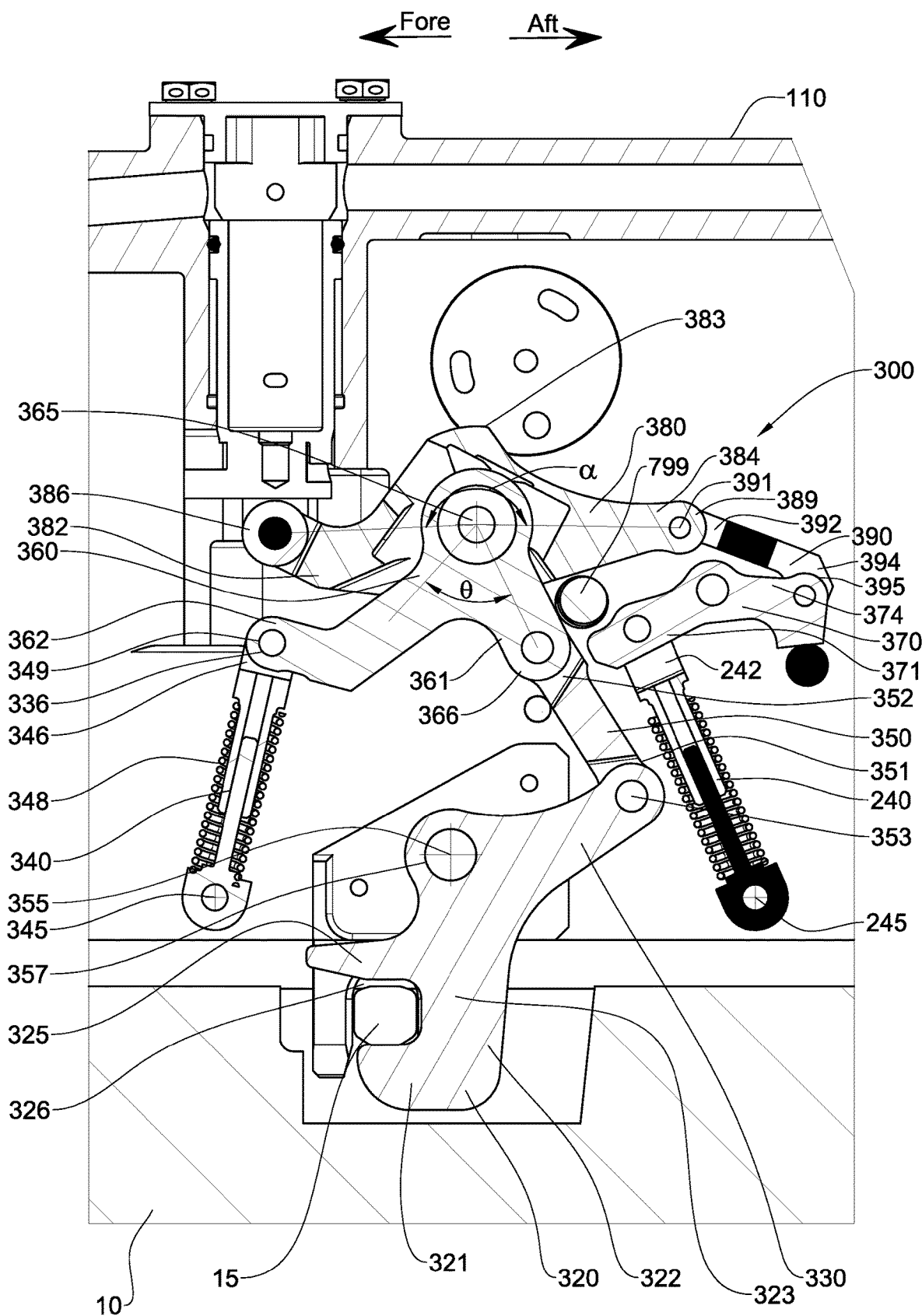
FIG. 5 shows in transverse cross-sectional view a detail of the example of FIG. 4.

The housing 110 accommodates lug engagement release system 300. Referring to FIGS. 4 and 5 in particular, lug engagement release system 300 comprises hook element 320 pivotably mounted with respect to side plates 120, 130 at about lateral pivot axis 355, via pin 357, to allow pivoting of the hook element 320 about lateral pivot axis 355. The lateral pivot axis 355 is fixed with respect to the housing 110.

Hook element 320 comprises a C-shaped or U-shaped engagement portion 322, defined by lower arm 321, base 323 and upper arm 325, which together partially circumscribe a space 326. The lower arm 321 is generally parallel to the upper arm 325, and facing in a general aft direction, and pivot axis 355 is located proximal to the connection between the upper arm 325 and the base 323. The hook element 320 further comprises an arm extension 330 that projects generally aft from upper arm 325, i.e., in a direction opposed to that of the lower arm 321 or upper arm 325. The extension 330 is pivotably connected at the end thereof to a first end 351 of a first link 350 via pin 353.

Figure 6A:
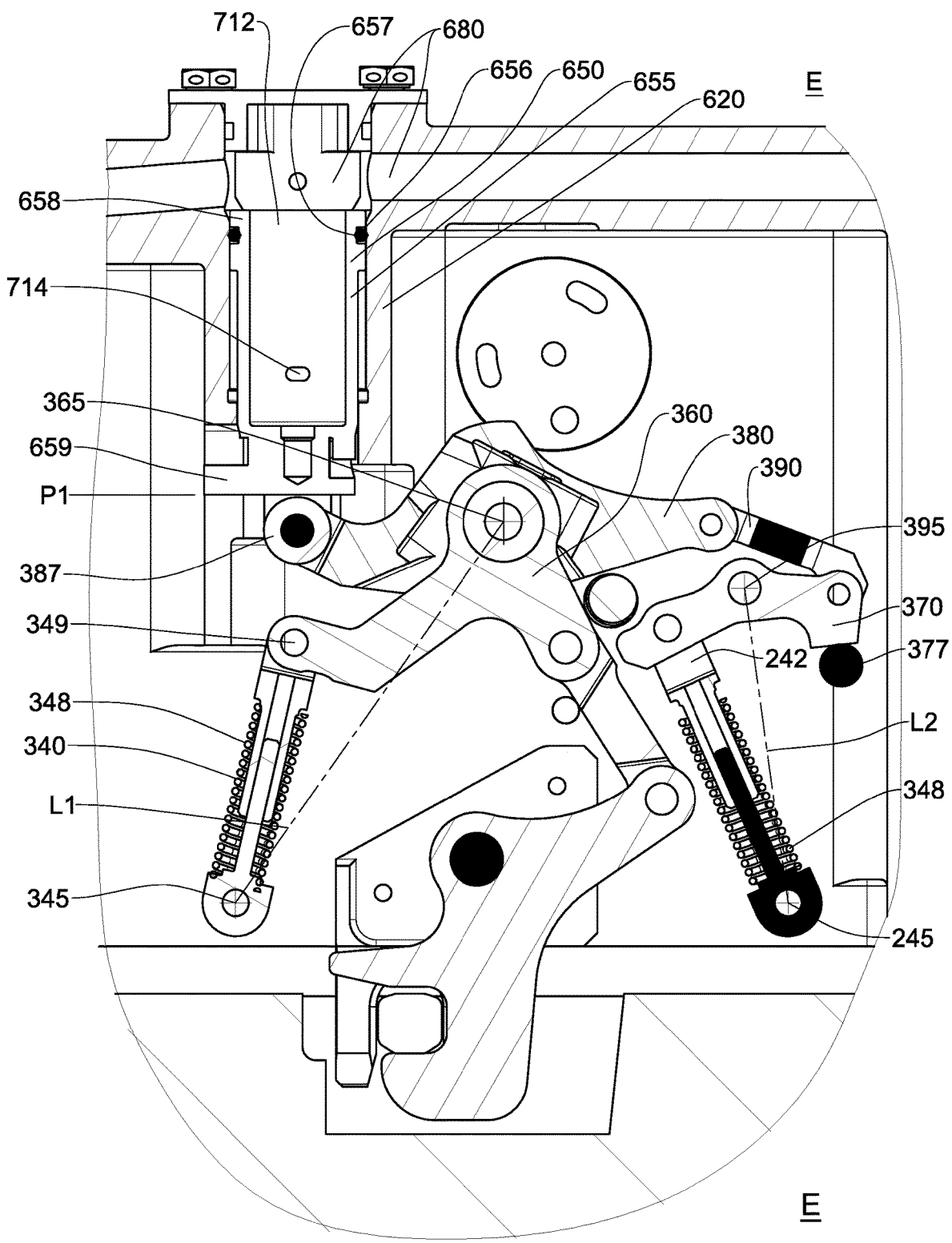
FIG. 6(a) shows in transverse cross-sectional view a detail of the example of FIG. 4 in which the lug engagement release system is in engaged configuration.
Figure 6B:
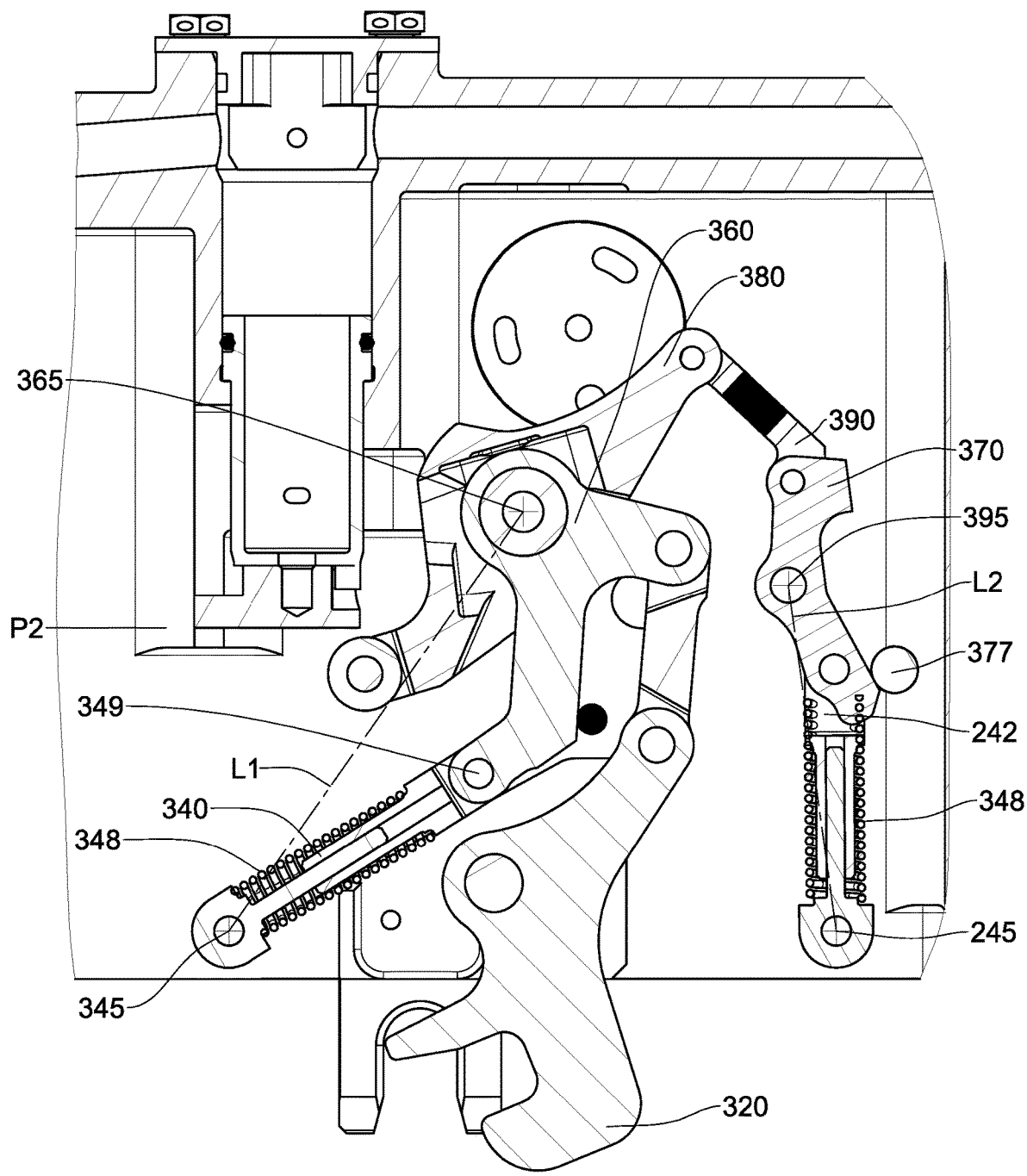
FIG. 6(b) shows in transverse cross-sectional view the detail of the example of FIG. 6(a) in which the lug engagement release system is in disengaged configuration.

The upper arm 325 of hook element 320 extends in a forward direction such as to enable contact between the lug and the arm in the "open" configuration shown in FIG. 6(b), when the lug engagement release system 300 is in the disengaged configuration.

The lug engagement release system 300 further comprises a coupling plate 360, pivotably mounted with respect to side plates 120, 130 about pivot axis 365 via a pin, to allow pivoting thereof about lateral pivot axis 365, which is fixed with respect to the housing 110. The coupling plate 360 comprises a first arm 361 radially projecting outwardly with respect to pivot axis 365, and a second arm 362 also radially projecting outwardly with respect to pivot axis 365 but angularly displaced from the first arm by an angle θ. In this example, angle θ is in the range of 20° and 160°, and more specifically about 90°.

The free end 366 of the first arm 361 is pivotably connected to the second end 352 of first link 350 via pin 356.

The free end 336 of second arm 362 is pivotably connected to a first stressed link 340 at its free end 346 via pin 349.

The first stressed link 340 is pivotably mounted between side plates 120, 130 about lateral pivot axis 345 via a pin, to allow pivoting thereof about lateral pivot axis 345, which is fixed with respect to the housing 110. The free end 346 of the link 340 is reciprocably displaceable in a radial direction with respect to pivot axis 345. First stressed link 340 is pre-stressed, comprising a pre-stressed helical spring 348 that biases the free send 346 in a direction towards pivot axis 345.

In alternative variations of this example the helical spring 348 can be replaced with a two or more than two spring elements, in each case each spring element being for example a helical spring or any other suitable spring capable of storing elastic potential energy when compressed.

The lug engagement release system 300 further comprises an anvil element 380, pivotably mounted with respect to side plates 120, 130, coaxially with respect to coupling plate 360, to also allow pivoting of the anvil element 380 about said lateral pivot axis 365, which, as already mentioned, is fixed with respect to the housing 110. The anvil element 380 comprises a first arm 382 radially projecting outwardly with respect to pivot axis 365, and a second arm 384 also radially projecting outwardly with respect to pivot axis 365 but angularly displaced from the first arm 382 by an angle α. In this example, angle α is in the range of 200° and 160°, and more specifically about 180°.

According to an aspect of the presently disclosed subject matter, the anvil element 380 can be pivoted about said lateral pivot axis 365 with respect to coupling plate 360 about a limited angular displacement; thereafter, additional angular displacement of the anvil element 380 about said lateral pivot axis 365 causes the coupling plate 360 to concurrently be displaced with the anvil element 380.

The anvil element 380 comprises a cam surface 383. A roller (not shown) connected to a microswitch (not shown) follows the cam surface 383, and thereby enables the microswitch to provide suitable control signals to a controller (not shown) indicative of whether the lug engagement release system 300 (via the angular position of the anvil element 380) is in the engaged configuration or the disengaged configuration.

The free end 386 of the first arm 382 of the anvil element 360 projects in a general forward direction.

The second arm 384 of the anvil element 380 projects in a general aft direction, and is freely pivoted at end 388 to one end 392 of second link 390 at pin 391.

A pivoting member 370 is pivotably mounted with respect to side plates 120, 130 to allow pivoting thereof about lateral pivot axis 395, which is fixed with respect to the housing 110. The pivoting member 370 has a first arm 371 and a second arm 374 projecting away from lateral pivot axis 395 in generally opposite directions.

As best seen in FIGS. 6(a) and 6(b) a mechanical stop 377 is provided in the housing 110 in proximity to the pivoting member 370, limiting clockwise pivoting of the pivoting member 370 to an angular position when the second arm 374 abuts the mechanical stop 377 (as seen in FIG. 6(a)), and limiting counter clockwise pivoting of the pivoting member 370 to an angular position when the first arm 371 abuts the mechanical stop 377 (as seen in FIG. 6(b)).

The other end 394 of second link 390 is freely pivoted to second arm 374 via a pin, and the first arm 371 is freely pivoted to a free end 242 of a second stressed link 240 at its free end 346 via a pin.

Second stressed link 240 is pivotably mounted with respect to side plates 120, 130 to allow pivoting of the second stressed link 240 about lateral pivot axis 245, which is fixed with respect to the housing 110. The free end 242 of the second stressed link 240 is reciprocably displaceable in a radial direction with respect to pivot axis 245. Second stressed link 240 is pre-stressed, comprising a pre-stressed helical spring 248 that biases the free end 246 in a direction towards pivot axis 245.

The free end 386 of first arm 382 of the anvil element 360 includes a roller 387, and is selectively actuable by the actuation system 600 to cause the lug engagement release system 300 to be actuated from the engaged configuration to the disengaged configuration, but only when the safety lock 799 of the safety system 700 is in the decoupled mode.

Thus, and referring in particular to FIG. 4, a first kinematic chain A is provided by the first stressed link 340, the coupling plate 360, the first link 350 and the hook element 320. Referring also to FIG. 6(a) and FIG. 6(b), the first kinematic chain A has two stable relative positions that minimize the potential energy of the spring 348, and in which the pin 349 is at a maximum distance from an imaginary line L1 joining the pivot axis 345 and the pivot axis 365.

The first stable position is illustrated in FIG. 6(a), in which the pin 349 is above line L1, and in which the hook element 320 is rotated clockwise to the closed or engaged position, enabling engagement with a lug.

The second stable position is illustrated in FIG. 6(b), in which the pin 349 is below line L1, and in which the hook element 320 is rotated counter clockwise to the open or disengaged position, enabling release of a lug previously engaged thereto, or enabling a lug 15 to be inserted into space 326 for subsequent engagement via the lug engagement release system 300.

The first kinematic chain A essentially thus operates as a lug engagement and release mechanism.

In order to load and engage a store 10, the first kinematic chain A must be in the second stable position shown in FIG. 6(b), allowing the lug 15 to be vertically inserted into the bottom of housing 110 along vertical axis LA (FIG. 4). As the lug is thus inserted and pushes against the upper arm 325, hook element 320 is caused to rotate in a clockwise direction about pivot axis 355 to the first stable position shown in FIG. 6(a), causing the lower arm 321 to enter into the lug 15 and come into load supporting contact therewith, the lug being accommodated in space 326.

Referring again to FIG. 4 in particular, a second kinematic chain B, defined by anvil member 380, second link 390, pivoting member 370, and second stressed link 240. The second kinematic chain B operates as a geometrical locking and unlocking mechanism for the first kinematic chain A.

The second kinematic chain B has two stable relative positions that minimize the potential energy of the spring 348, and in which the free end 242 is at a maximum distance from an imaginary line L2 joining the pivot axis 245 and the pivot axis 395.

The first stable position is illustrated in FIG. 6(a), in which the free end 242 is on the forward (left) side of line L2, and in which the pivoting member 370 is rotated clockwise to the geometrical locked position, thereby geometrically locking the first kinematic chain A.

The second stable position is illustrated in FIG. 6(b), in which the pin 349 is on the aft (right) side of line L2, and in which the pivoting member 370 is rotated counter clockwise to the unlocked position, thereby unlocking the first kinematic chain A, which can then go from the engaged configuration to the disengaged configuration.

Referring in particular to FIGS. 1 and 4, the actuation system 600 is configured, in operation of the support and release device 100, for operating under the action of gas pressure, and comprises an inlet port 610 connectable to a pressurized gas source 690. For example, the gas source 690 can comprise one or more pressurized gas bottles filled with a suitable gas at high pressure, for example nitrogen gas. Alternatively, the gas source can include a pyrotechnic device that generates high pressure on ignition of pyrotechnic materials therein.

Figure 7:
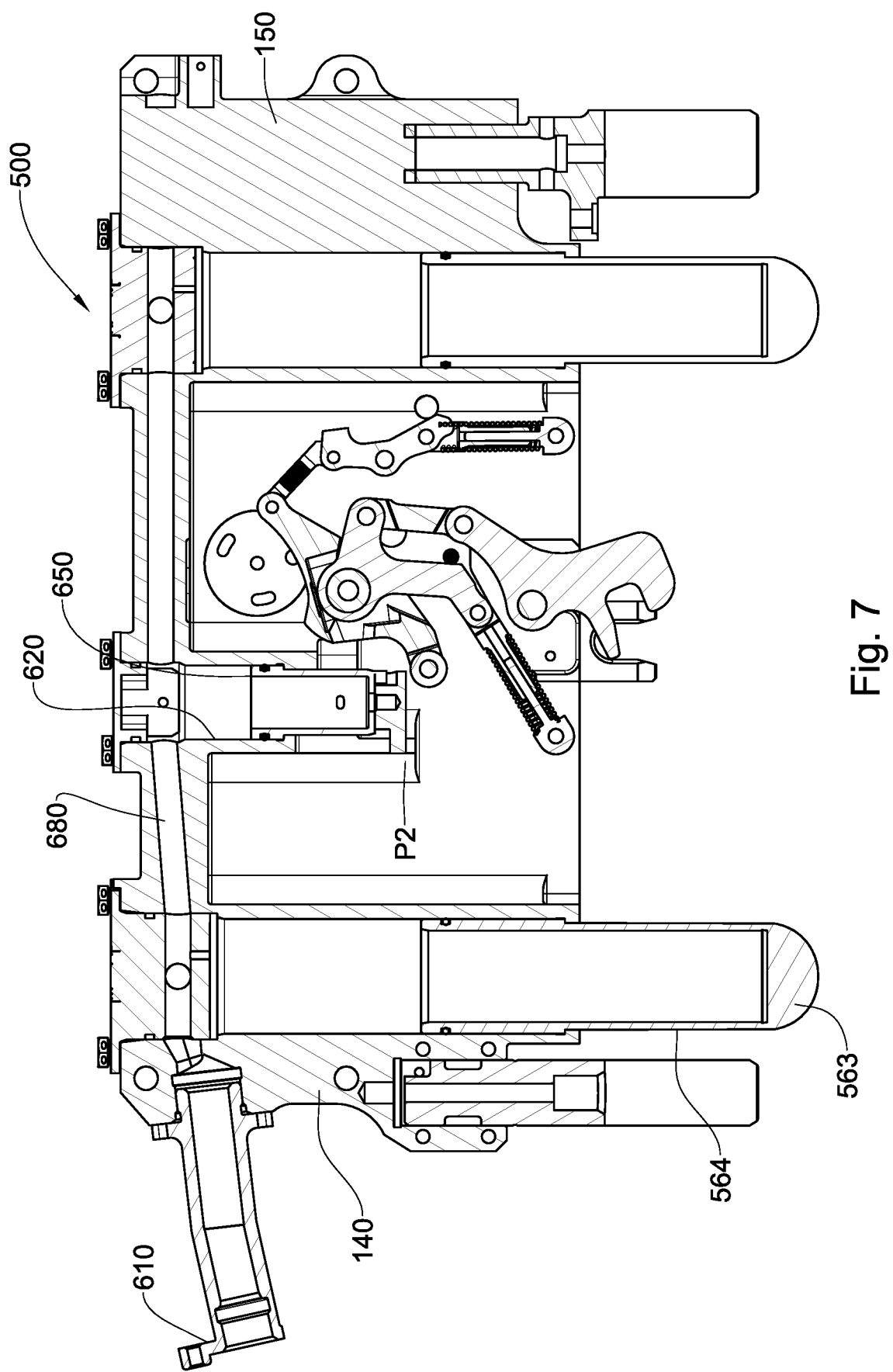
FIG. 7 shows in transverse cross-sectional view the example of FIG. 4 in which the lug engagement release system is in disengaged configuration and in which the ejector system has been actuated.

Referring in particular to FIGS. 4 and 7, actuation system 600 comprises piston 650 reciprocally mounted in cylinder 620 between a nominal first position P1 and a second position P2.

The actuation system 600 also comprises a conduit 680 extending between the inlet port 610 and the cylinder 620, providing fluid communication therebetween and thus providing fluid communication between the pressurized fluid source 690 (when connected to the inlet port 610) and the piston 650. The cylinder 620 can thus be considered as an extension of the fluid conduit 680, and piston 650 is thus reciprocally mounted with respect to the conduit 680.

The actuator system 600 is configured for selectively providing an actuation operation such as to cause the lug engagement release system 300 to go from engaged configuration to the disengaged configuration (concurrent with the safety lock 799 being in uncoupled mode). This actuation operation is responsive to the aforementioned actuation pressure AP being applied within the actuator system 600 via gas provided by the pressurized gas source 690.

Referring again to FIGS. 3, 4, 7, the support and release device 100 is optionally configured for forcibly ejecting the store 10 away from the device 100, and thus away from the air vehicle, when disengaged therefrom. In this connection, the support and release device 100 comprises an ejector system 500.

The device 100 can be operated absent the ejector system 500, and thus allows the stores to drop away therefrom under the influence of gravity once released from the hook element.

However, in the present example, the support and release device 100 is configured for forcibly ejecting the store away from the device 100 and thus away from the air vehicle. Thus, alternatively, and optionally, the device 100 can be operated together with ejector system 500, configured for forcibly ejecting the store away from the device 100 and thus away from the air vehicle, once the stores 10 is released from the device 100.

The ejector system 500 in at least this example comprises at least one ejection module 560 configured for forcibly ejecting a store away from the device 100. In particular, each ejection module 560 is configured for providing an ejection force generated under action of gas pressure provided by the actuation system 600.

In this example, the ejector system 500 comprises two ejection modules 560, which are essentially identical to one another, and thus, only one shall be described herein. In alternative variations of this example, the ejector system 500 can instead comprise one or more than two ejection modules 560. In this example one ejection module 560 is accommodated in the forward end block 140 and the other ejection module 560 is accommodated in aft end block 150.

In a first example, the ejection module 560 comprises a tubular housing 562, extending along a longitudinal axis 501. The tubular housing 562 accommodates a telescopic plunger element 564, which in alternative variations of this example can optionally include a plurality nested telescopic elements. The telescopic plunger element 564 comprises an end wall at a first longitudinal end 561 thereof having a small opening 569, and is closed at a second longitudinal end 563 thereof.

The second longitudinal end 563 comprises a padded abutment element 566, configured for abutting against the stores 10 when this is engaged with the device 100.

In the present example, the support and release device 100 further comprises sway braces 570, fixed to the forward end block 140 and to the aft end block 150.

The first longitudinal end 561 is in open fluid communication with the conduit 680 via opening 569, and thus with the pressurized gas source 690 when this is connected to the inlet 610. Thus, when the actuator system 600 is operated to apply the actuation pressure to the piston 650 via the conduit 680, pressure is also applied to the plunger element 564, which then extend out of their respective housings 562, thereby pushing off the stores 10 away from the device 100.

Referring in particular to FIG. 2, safety lock 799 is, in at least this example, in the form of a pin that is reversible insertable into the housing 110 along extraction axis EA via aligned lateral openings 119 in the side plates 120, 130. The safety lock 799 is selectively inserted in the housing 110 along extraction axis EA to provide the coupled mode, and the safety lock 799 selectively extracted from the housing 110 along extraction axis EA to provide the decoupled mode.

Referring in particular to FIG. 3, an arm 389 is rigidly affixed to the anvil element 380 radially projecting away from axis 365 in a general direction towards the extraction axis EA. In particular, when the safety lock 799 is in the coupled mode, the arm 389 abuts the safety lock 799, and thus the arm 389, together with the anvil element 380, are prevented from pivoting about pivot axis 365, thereby preventing the lug engagement release system 300 from going to the disengaged configuration, even if the actuator system 600 is operated to provide the actuation pressure AP.

On the other hand, when the when the safety lock 799 is removed from the housing 110 and the safety lock 799 is thus in the uncoupled mode, the arm 389 together with the anvil element 380, are now able to pivot about pivot axis 365, thereby allowing the lug engagement release system 300 to go to the disengaged configuration, responsive to the actuator system 600 being operated to provide the actuation pressure AP.

As mentioned above, the safety system 700 is configured for preventing said actuation pressure AP being applied to the actuator system 600, in particular to the piston 650, when the safety lock 799 is concurrently in coupled mode.

In the engaged configuration, the piston 650 is in the nominal first position P1 (FIG. 4). When the actuation operation is initiated by the actuator system 600, and the safety lock 799 is concurrently in uncoupled mode, gas pressure at actuation pressure AP is applied to the piston 650, causing the piston 650 to be displaced to position P2 (FIG. 7).

In doing so, the piston 650, which abuts the roller 387 at the first arm 382, applies a torque to the anvil member 380, initially pivoting the anvil in a counter clockwise direction (as seen in FIG. 6(a)) about pivot axis 365 through a first angular displacement. Thereafter, and referring to FIG. 6(d), the anvil member 380 locks onto the coupling plate 360, and together pivot by a further angular displacement about axis 365 until the geometric lock between the second link 390 and pivoting member 370 is unlocked, thereby pivoting the first stressed link 340 past the line L1, which then results on the first stressed link 340 to continue to pivot to its second position, concurrently causing the hook element 320 to pivot about axis 355 and thus to open, thereby disengaging the lug 15 and thus allowing the lug 15, and thus the stores 10, to be released.

The safety system 700 is configured for providing free fluid communication between the inlet port 610 (and thus between the pressurized gas source 690) and the external environment E (typically the atmosphere) when the removable safety lock 799 is in said coupled mode. The safety system 700 is further configured for preventing free fluid communication between the inlet port 610 and the external environment E when the removable safety lock 799 is in the coupled mode.

Figure 8:
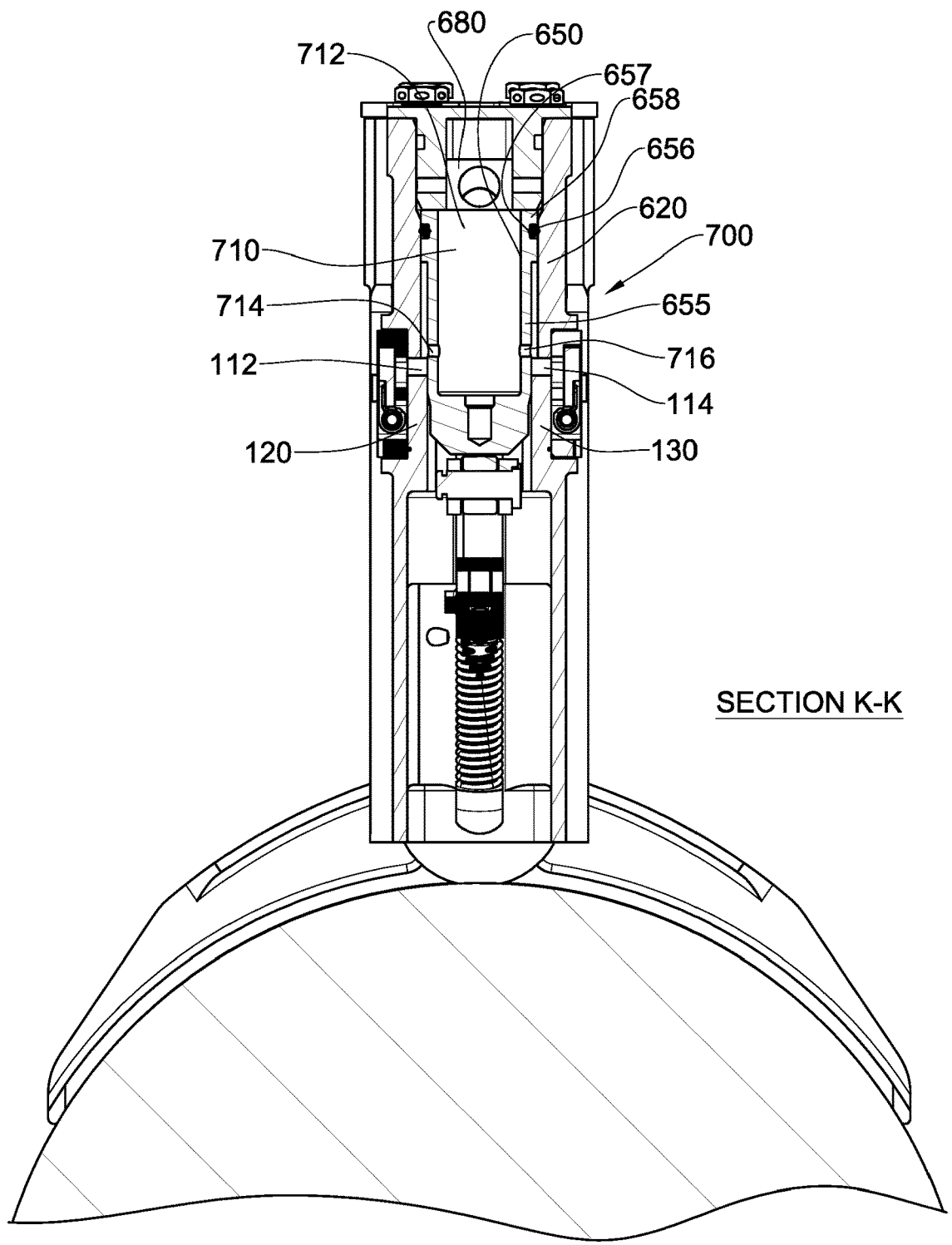
FIG. 8 shows in cross-sectional view the example of FIG. 4, taken along section K-K.

In this example, and as best seen in FIG. 6(a) and FIG. 8, the piston 650 comprises a piston head 658 having an upper face in fluid communication with the conduit 680, and a lower projection 659 configured for abutment with respect to the anvil member 380, in particular the roller 387 thereof. The piston head 658 further comprises a peripheral wall 655 facing an inside of the cylinder 620. The piston head 658 further comprises a peripheral groove 657 on peripheral wall 655 in which a suitable ring seal 656 is accommodated for providing a suitable seal between the piston head 658 and the cylinder 620.

In this example, safety system 700 is in the form of a fluid venting arrangement, and comprises a fluid venting conduit 710 provided in the piston 650. The fluid venting conduit 710 comprises an inlet opening 712 provided at the top face 652 of the piston 650, and two outlet openings 714, 716 provided on the peripheral wall 655. There is open fluid communication between inlet opening 712 and the conduit 680, and thus between inlet opening 712 and the inlet port 610, and thus between inlet opening 712 and the pressurized gas source 690.

There is also open fluid communication in fluid venting conduit 710 between inlet opening 712 and the two outlet openings 714, 716.

In this example, safety system 700 further comprises two cylinder openings 112, 114, provided in the cylinder 620, passing through the thickness of the cylinder 620.

Figure 6C:
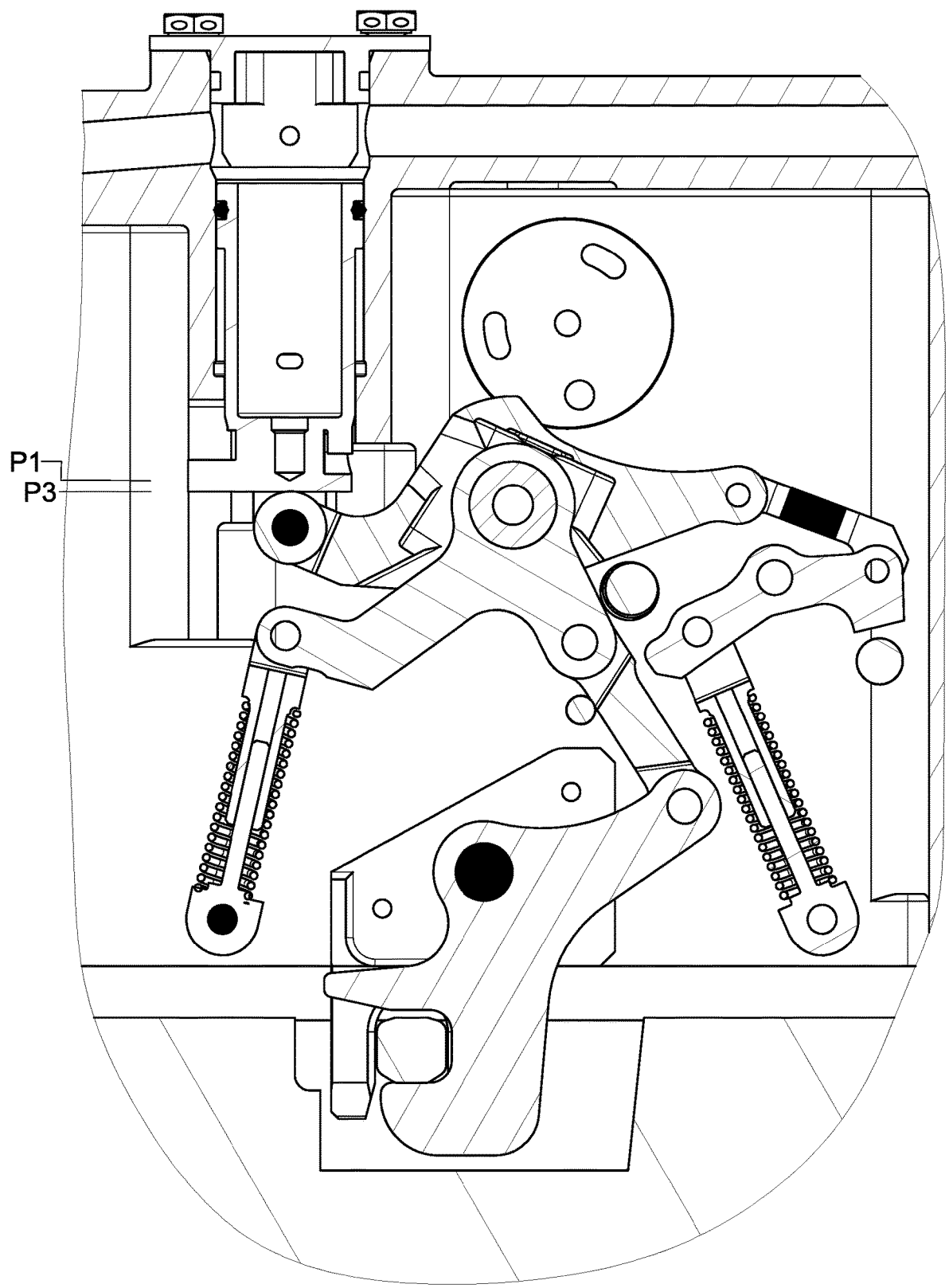
FIG. 6(c) shows in transverse cross-sectional view the detail of the example of FIG. 6(a) in which the lug engagement release system has just begun to go move from engaged configuration.
Figure 6D:
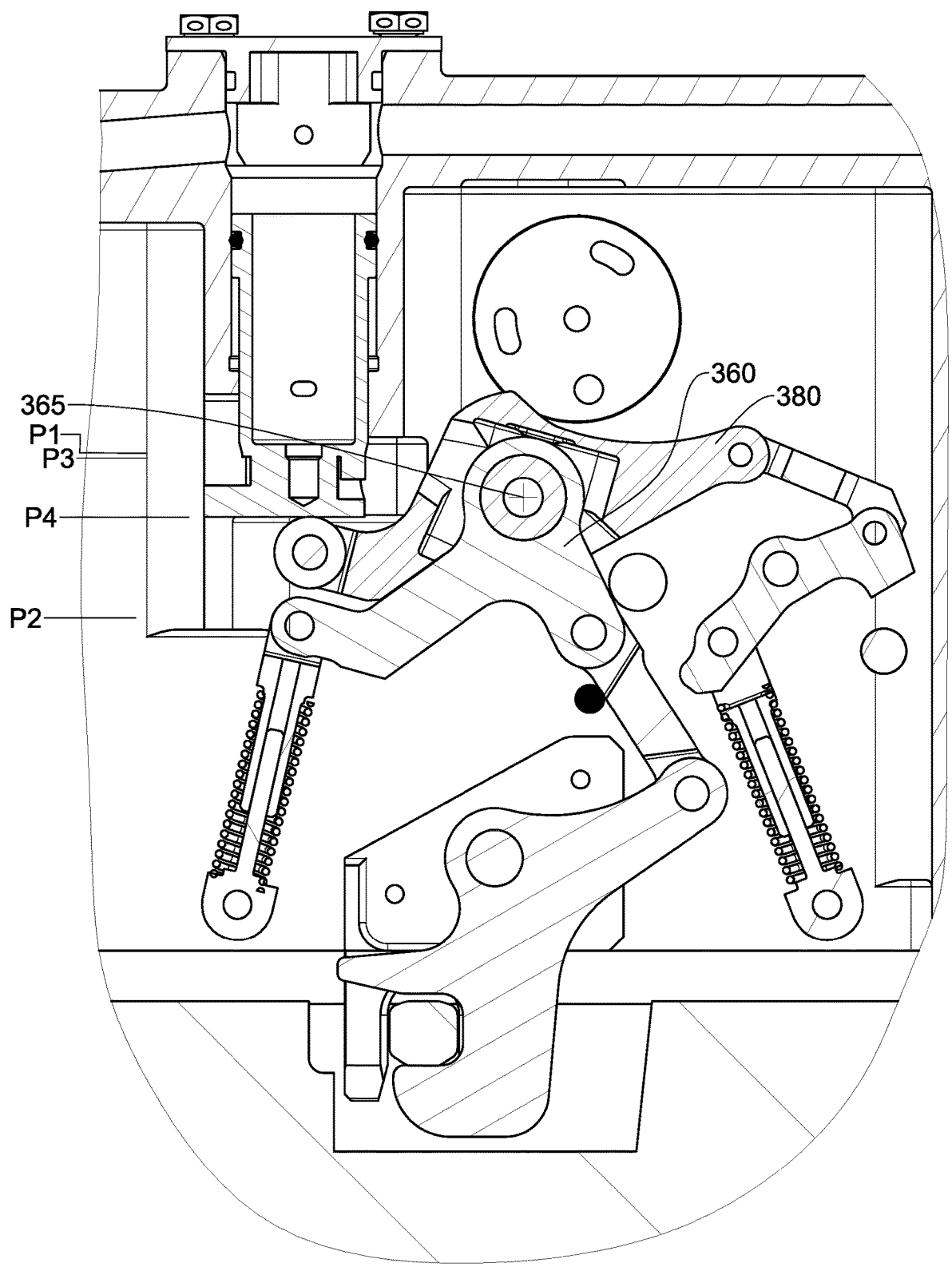
FIG. 6(d) shows in transverse cross-sectional view the detail of the example of FIG. 6(a) in which the anvil member locks with the pivot plate.

The cylinder openings 112, 114 are located on the cylinder 620 at positions:

such as to be in registry with the outlet openings 714, 716, when the piston 650 is at or close to position P1, in at particular position P3 (FIG. 6(c)) so that there is free fluid communication between the external environment E and the fluid conduit 680, via the fluid venting conduit 710 and cylinder openings 112, 114; and such as not to be in registry with the outlet openings 714, 716, when the piston 650 is has moved significantly away from position P3 in a direction towards position P2, past position P4 and until position P2 (see also FIG. 6(d)), and thus part of the side plates 120, 130 are continuously in registry with the outlet openings 714, 716 and thereby block fluid communication between external environment E and the conduit 680; in other words, from when the piston 650 is has moved significantly away from position P3, has moved through and past position P4, and until position P2, the outlet openings 714, 716, are effectively closed and do not allow venting of the pressurized gas to the external environment E.

Thus, at position P1, and more particularly at position P3, the and concurrent with the safety lock 799 being in coupled mode, the safety system 700 is designed to cope with a design condition in which the pressure within the conduit 680 begins to increase, for example as a result of the actuation system 600 being actuated (either by accident or because of a malfunction, for example). In such a design condition, the safety system 700 provides an escape for the gas pressure, by venting the pressurized gas, which otherwise (i.e., under alternative conditions in which the safety system 700 is absent or non-operational) would increase, for example to the actuation pressure AP or greater. The safety system 700 thus prevents the pressure in the conduit 680 from reaching the actuation pressure AP and in particular from significantly exceeding the increasing actuation pressure AP, and thus enables the housing 110 to be designed with a considerably reduced safety margin, as regards capability for holding large internal pressure, as could otherwise be required under such alternative conditions.

It is to be noted that under nominal operating conditions, the safety lock 799 is uncoupled from the coupled mode to the uncoupled mode prior to take off, for example by ground crew. At some later point in the mission when it is required to eject the stores 10, the actuation system 600 is actuated, the pressure within the conduit 680 increases up to the actuation pressure AP. As the piston 650 moves from position P1 to position P3 under the action of the gas pressure, some gas is vented to the external environment E via the safety system 700, i.e., via the outlet openings 714, 716 which are, in position P3, temporarily in registry with cylinder openings 112, 114 and thus open with respect to the external environment E. Nevertheless, since the safety lock 799 is in the uncoupled mode, the piston 650 continues to move quickly past position P3, past position P4 and towards position P2, responsive to the actuation pressure AP being applied thereto. This is because in the uncoupled mode, the anvil member 380 is no longer prevented from pivoting and thus from preventing further displacement of the piston 650. The actuation pressure AP is sufficient, in the uncoupled mode, to further displace the piston 650 past position P3 so that the outlet openings 714, 716, are no longer in registry with the cylinder openings 112, 114, i.e., the outlet openings 714, 716, are effectively closed with respect to the external environment E, and thereby further venting of the pressurized gas to the external environment E from the conduit 680 is halted, preventing any further venting of gas from the actuator system 600 via the safety system 700. This also enables the full actuation pressure AP to be applied to the piston 650 which can then be fully displaced, first to position P4 (FIG. 6(d)) and thereafter to position P2, concurrently actuating the engagement release system 300 to cause this to go from engaged configuration to the disengaged configuration. While the piston 650 is being partially displaced from position P3 towards position P4, the anvil member 380 is rotated about axis 365 until it comes into abutting contact with, and the anvil member 380 locks onto, the coupling plate 360. Thus in the time period corresponding to movement of the piston 650 from position P3 to position P4, it is possible for pressure in the actuation system 600 to rise, for example up to or close to the actuation pressure AP, as pressurized gas is provided via the conduit 680, prior to the coupling plate 360 being activated by the anvil member 380. At position P4, the anvil member 380 locks onto the coupling plate 360, and together pivot by a further angular displacement about axis 365 until the geometric lock between the second link 390 and pivoting member 370 is unlocked, responsive to further displacement of the piston 650 from position P4 to position P2.

Concurrently, the actuation system 600 also actuates the ejector system 500 causing the telescopic plunger elements 564 to be extended from the respective tubular housings 562 under action of gas pressure provided by the actuation system 600, thereby providing an ejection force to the stores 10 after this has been disengaged from the device 100.

On the other hand, and at the aforementioned design condition, shortly after such an event of the actuation system 600 being actuated while the safety lock 799 is concurrently in coupled mode, the pressure within the conduit 680 causes the piston 650 to be displaced from position P1 to position P3, and the piston 650 remains at position P3 since further displacement of the piston 650 is resisted by the anvil element 380, which is prevented from pivoting by abutment of the arm 389 against the coupled safety lock 799. By the piston 650 remaining at position P3, the fluid venting conduit 710 allows venting of the pressurized gas from the pressurized source 690, and the pressure within the conduit 680 reduces and eventually settles at around ambient pressure (i.e., the pressure of the external environment E). Accordingly, under such conditions there is insufficient gas pressure within the actuation system 600 to cause the engagement release system 300 to go to disengaged configuration. Similarly, under such conditions there is insufficient gas pressure within the actuation system 600 to cause the telescopic plunger elements 564 to be extended from the respective tubular housings 562, thereby avoiding the application of an undesired mechanical load on the stores 10 while still engaged to the device 100. It is then safe to decouple the safety lock 799 to uncoupled mode (for example by ground crew, once the air vehicle lands), without risk of the actuation system 600 actuating the engagement release system 300 to cause this to go from the engaged configuration to the disengaged configuration. It is also then possible to replace the pressurized gas source 690 with another pressurized gas source, for example, and to enable the air vehicle to once again resume the mission with the same stores.

Such aforesaid alternative conditions with the safety lock 799 still being in coupled mode could result in excessive pressure buildup within the actuator system 600, which is considered undesirable, and moreover would requires the housing 110, and in particular the conduit 680 to be designed to contain such excess pressure over a long period.

Furthermore, such alternative conditions of such pressure buildup with the safety lock 799 still being in coupled mode can also result in excessive and/or undesirable mechanical loads being applied to the stores via the hook element 320, and/or via the ejector system 500.

Furthermore, such alternative conditions of pressure buildup with the with the safety lock 799 still being in coupled mode can also present a risk element, since subsequent uncoupling of the safety lock 799 to the uncoupled mode (which typically is carried out by the grounds crew, well before the aircraft takes off) can then cause the stores 10 to be ejected, in particular forcibly ejected, with the aircraft still on the ground, which can have serious or even catastrophic consequences, particularly if the stores 10 is a bomb or a fuel tank, for example.

Furthermore, such alternative conditions of such pressure buildup with the safety lock 799 still being in coupled mode can also result in a number of procedures having to be implemented to subsequently de-pressurize the conduit 680 to safe conditions, and to replace the pressurized gas source 690 with another pressurized gas source, for example.

The outside of the cylinder 620, in this example, is inside the housing 110 but still in free fluid communication with the outside environment E. In alternative variations of this example, the outside of the cylinder 620, can instead be partially or fully outside the housing 110 and in any case in free fluid communication with the outside environment E.

In the example of FIGS. 1 to 8, the actuating piston 650 itself of the actuation system 600 also includes part of the safety system 700, in particular the fluid venting conduit 710 that is used for venting pressurized gas.

However, in alternative examples of the presently disclosed subject matter, the safety system 700 can be structurally and/or functionally independent of the actuation system 600.

Figure 9:
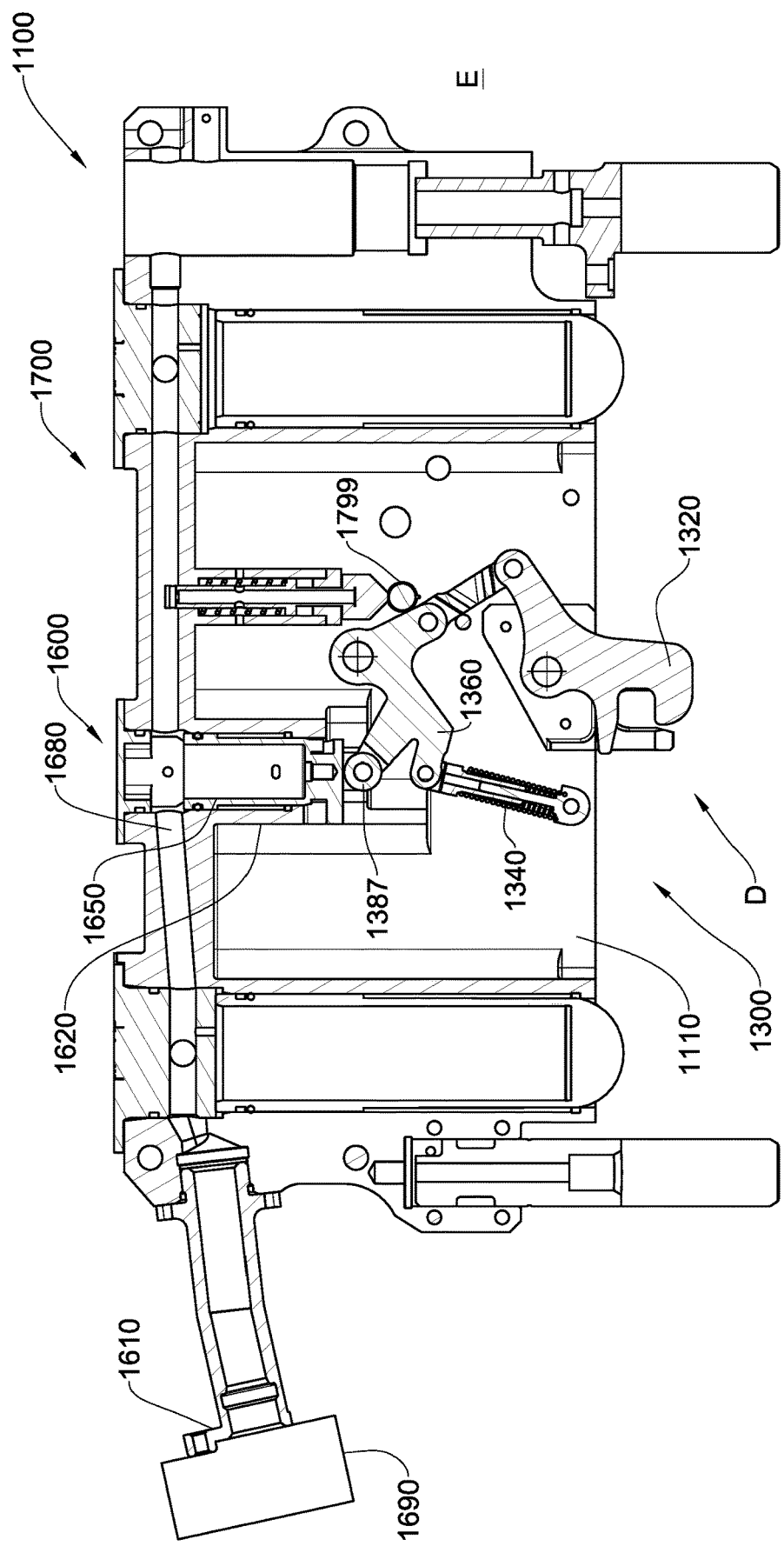
FIG. 9 shows in cross-sectional view a support and release device according to a second example of the presently disclosed subject matter.
Figure 10:
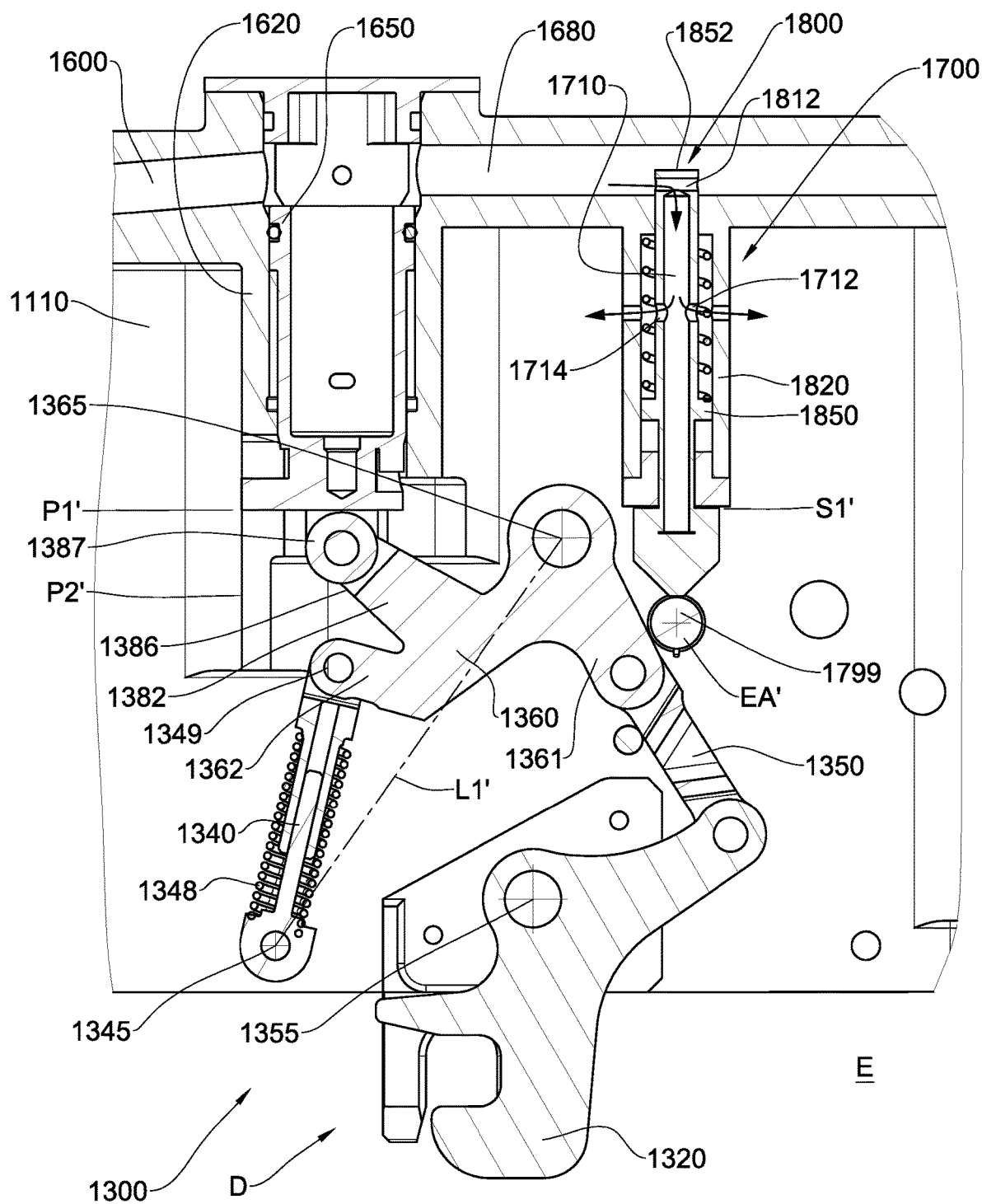
FIG. 10 shows in transverse cross-sectional view a detail of the example of FIG. 9 in which the lug engagement release system is in engaged configuration and the safety lock is in coupled mode.
Figure 11:
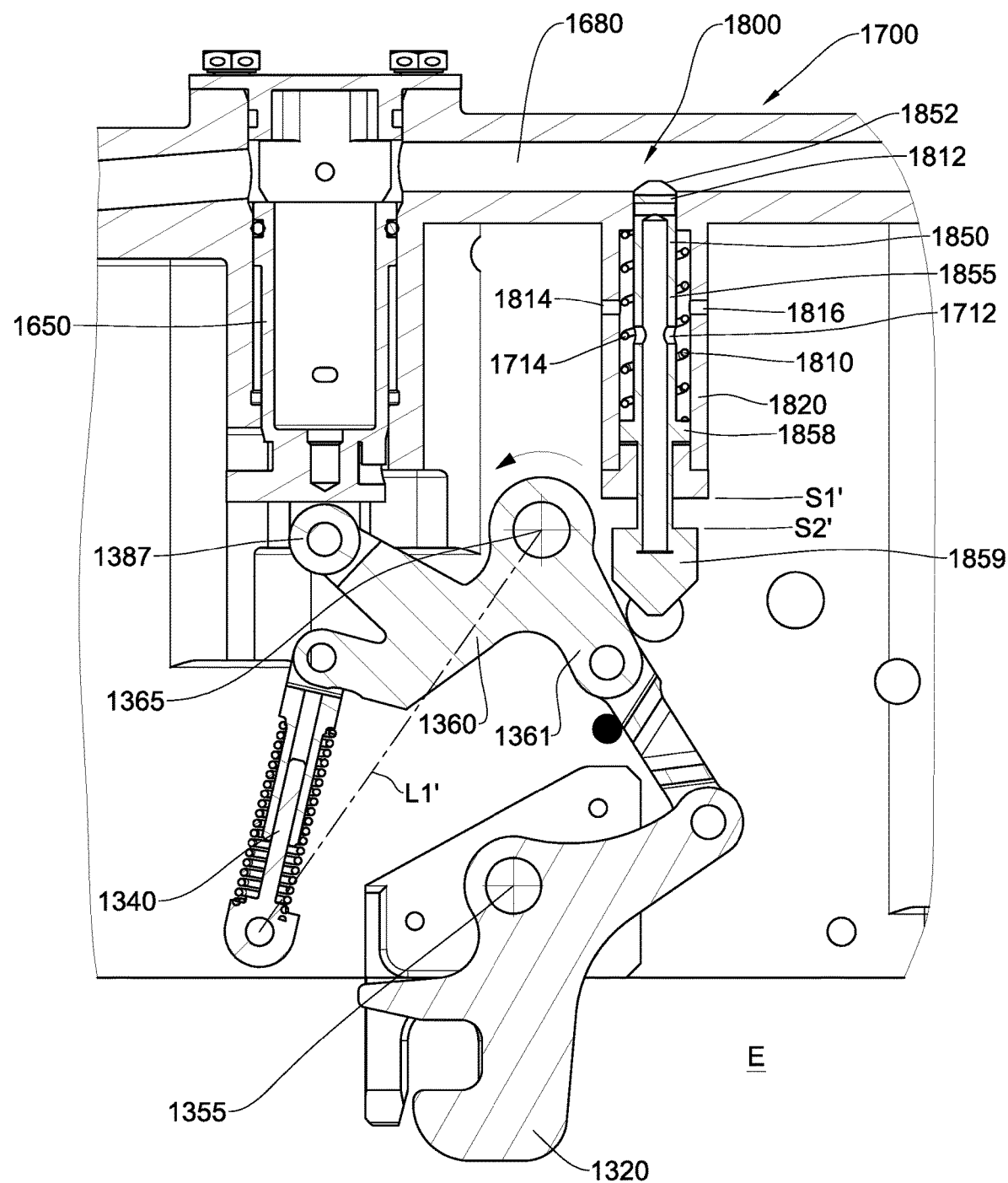
FIG. 11 shows in transverse cross-sectional view the example of FIG. 10 in which the safety lock is in uncoupled mode.

For example, and referring to FIGS. 9, 10 and 11, a support and release device according to a second example of the presently disclosed subject matter, generally designated 1100, is similar to the device 100 according to the first example, with some differences as discussed herein, mutatis mutandis.

In the second example, the device 1100 comprises a lug engagement release system 1300, actuation system 1600, and safety system 1700 comprising safety lock 1799, respectively corresponding to the lug engagement release system 300, actuation system 600, and safety system 700 and safety lock 799 as disclosed herein for the first example, mutatis mutandis.

In the second example, the device 1100 comprises housing 1110, and optionally further comprises an ejector system 1500 and/or sway braces 1570, which can be similar to the housing 110, the ejector system 500 and/or sway braces 570, respectively, as disclosed herein for the first example, mutatis mutandis.

In the second example the lug engagement release system 1300 comprises as single kinematic chain D for the purpose of maintaining the device compact, in view of the structure and layout of the actuation system 600, and safety system 700, but it is to be noted that the device 1100 can instead replace the lug engagement release system 1300 with the lug engagement release system 300 of the first example, mutatis mutandis. Similarly, it is to be noted that the device 100 of the first example can instead replace the lug engagement release system 300 with the lug engagement release system 1300 of the second example, mutatis mutandis. It is also to be noted that according to an aspect of the presently disclosed subject matter, the safety system 700 of the first example, or the safety system 1700 of the second example, can be implemented in any one of variety of support and release devices, in which the respective lug engagement release system can be conventional or non-conventional and in any case actuated via a pressurized gas based actuation system. For example, the lug engagement release system 300 of the first example, or the lug engagement release system 1300 of the second example, can each be replaced with the combination of the first kinematic chain A and the second kinematic chain B as disclosed in pages 9 to 20 of WO 2016/199132, mutatis mutandis, and the contents of WO 2016/199132, in particular pages 9 to 20 thereof, are incorporated herein by reference.

Referring again to FIGS. 9, 10 and 11, the lug engagement release system 1300 comprises a single kinematic chain D, including a first stressed link 1340, pivot axis 1355, pivot axis 1365, a coupling plate 1360, a first link 1350 and a hook element 1320, which are similar to the first stressed link 340, the pivot axis 355, the pivot axis 1365, the coupling plate 360, the first link 350 and the hook element 320, respectively, as disclosed herein for the first kinematic chain A of first example, mutatis mutandis, with the following difference. It is to be noted that the coupling plate 1360 comprises a first arm 1361 radially projecting outwardly with respect to pivot axis 1365, and a second arm 1362 also radially projecting outwardly with respect to pivot axis 1365, in a similar manner to the radially projecting first arm 361 and second arm 362 of coupling plate 360 of the first example, mutatis mutandis. However, in the lug engagement release system 1300, instead of including the second kinematic chain, the coupling plate 1360 further comprises a third arm 1382 radially projecting outwardly with respect to pivot axis 1365, and the free end 1386 of the third arm 1382 projects in a general forward direction.

The free end 1386 of third arm 1382 of the coupling plate 1360 includes a roller 1387, and is selectively actuable by the actuation system 1600 to cause the lug engagement release system 1300 to be actuated from the engaged configuration to the disengaged configuration, but only when the safety lock 1799 of the safety system 1700 is in the decoupled mode.

In a similar manner to the first kinematic chain A of the first example, mutatis mutandis, the single kinematic chain D also has two stable relative positions that minimize the potential energy of the spring 1348, and in which the pin 1349 of the first stressed link 1340 (corresponding to the spring 348, and in which the pin 349, respectively, of the first stressed link 340 of the first example, mutatis mutandis) is at a maximum distance from an imaginary line L1' joining the pivot axis 1345 and the pivot axis 1365.

The first stable position is illustrated in FIG. 10, in which the pin 1349 is above line L1', and in which the hook element 1320 is rotated clockwise to the closed or engaged position, in which it is or can be in engagement with a lug.

The second stable position is not illustrated in the figures but corresponds to the second stable position of the first kinematic chain A of the first example illustrated in FIG. 6(b), in which the pin 1349 is below line L1', and in which the hook element 1320 is rotated counter clockwise to the open or disengaged position, enabling release of a lug previously engaged thereto, or enabling a lug to be subsequently inserted into the hook element 1320 and engaged via the lug engagement release system 1300.

Thus, in a similar manner to the first kinematic chain A, mutatis mutandis, the single kinematic chain D essentially also operates as a lug engagement and release mechanism.

In order to load and engage a store 10, the single kinematic chain D must be in the second stable position allowing the lug to be vertically inserted into the bottom of housing 1110 along vertical axis LA'. As the lug is thus inserted and pushes against the upper arm of the hook element 1320, hook element 1320 is caused to rotate in a clockwise direction about pivot axis 1355 to the first stable position shown in FIG. 11, causing the lower arm of the hook element 1320 to enter into the lug and come into load supporting contact therewith.

The actuation system 1600, in a similar manner to the actuation system 600 of the first example, mutatis mutandis, is configured, in operation of the support and release device 1100, for operating under the action of gas pressure, and comprises an inlet port 1610 connectable to a pressurized gas source 1690, piston 1650 reciprocally mounted in cylinder 1620 between a nominal first position P1' and a second position P2', and a fluid conduit 1680 extending between the inlet port 1610 and the cylinder 1620, providing fluid communication therebetween and thus providing fluid communication between the pressurized fluid source 1690 (when connected to the inlet port 1610) and the piston 1650, which in this example are similar to the inlet port 610, pressurized gas source 690, piston 650, cylinder 620, nominal first position P1, second position P2, fluid conduit 680, respectively, of the first example, mutatis mutandis.

In a similar manner to the actuator system 600 of the first example, mutatis mutandis, the actuator system 1600 of the second example is also configured for selectively providing an actuation operation such as to cause the engagement release system 1300 to go from engaged configuration to the disengaged configuration (concurrent with the safety lock 1799 being in uncoupled mode). This actuation operation is responsive to the aforementioned actuation pressure AP being applied within the actuator system 1600 via gas provided by the pressurized gas source 1690.

Referring in particular to FIG. 10, safety lock 1799 is, also in this example, in the form of a pin that is reversible insertable into the housing 1110 along extraction axis EA' via aligned lateral openings in the side plates of the housing 1110. The safety lock 1799 is selectively inserted in the housing 1110 along extraction axis EA' to provide the coupled mode, and the safety lock 1799 selectively extracted from the housing 1110 along extraction axis EA' to provide the decoupled mode.

Referring again to FIG. 10, the extraction axis EA' is in close proximity to the first arm 1361 of the coupling plate 1360, and is located in the path of the arm 1361 as the coupling plate 1360 is pivoted about axis 1365 from the first stable position towards the second stable position of kinematic chain D. Thus, when the safety lock 1799 is in the coupled mode, the first arm 1361 abuts the safety lock 1799, and thus the coupling plate 1360 via the first arm 1361, is prevented from pivoting about pivot axis 1365, thereby preventing the lug engagement release system 1300 from going towards the disengaged configuration, even if the actuator system 1600 is operated to provide the actuation pressure AP.

On the other hand, when the when the safety lock 1799 is removed from the housing 1110 and the safety lock 1799 is thus in the uncoupled mode (FIG. 11), the first arm 1361, together with the rest of the coupling plate 1360, are now able to pivot about pivot axis 1365, thereby allowing the lug engagement release system 1300 to go to the disengaged configuration, responsive to the actuator system 1600 being operated to provide the actuation pressure AP.

In a similar manner to the safety system 700 of the first example above, mutatis mutandis, the safety system 1700 in the second example is configured for preventing said actuation pressure AP being applied to the actuator system 1600, in particular to the piston 1650, when the safety lock 1799 is concurrently in coupled mode.

Referring in particular to FIG. 11, in the engaged configuration of the lug engagement release system 1300, the piston 1650 is in the nominal first position P1'. When the actuation operation is selectively initiated by the actuator system 1600, and the safety lock 1799 is concurrently in uncoupled mode, gas pressure at actuation pressure AP is applied to the piston 1650, causing the piston 1650 to be displaced to position P2'.

In doing so, the piston 1650, which abuts the roller 1387 at the first arm 1382, applies a torque to the pivoting member 1360, pivoting the pivoting member 1360 in a counter clockwise direction (as seen in FIG. 11) about pivot axis 1365 through an angular displacement, thereby pivoting the first stressed link 1340 towards and past the line L1', which then results on the first stressed link 1340 to continue to pivot to its second position, concurrently causing the hook element 1320 to pivot about axis 1355 and thus to open, thereby disengaging the lug and thus allowing the lug, and thus the stores, to be released.

In this example, the safety system 1700 is configured for providing free fluid communication between the fluid conduit 1680 (and thus between the pressurized gas source 1690) and the external environment E (typically the atmosphere) when the removable safety lock 1799 is in said coupled mode. The safety system 1700 is further configured for, conversely, preventing free fluid communication between the fluid conduit 1680 and the external environment E when the removable safety lock 1799 is in the coupled mode.

In this example, and as best seen in FIG. 10 and FIG. 11, the safety system 1700 comprises a fluid venting arrangement 1800 that is independent of and different from, structurally as well as functionally, piston 1650. As will become clearer herein, the venting arrangement 1800 is nevertheless coupled to the actuator system 1600.

The venting arrangement 1800 comprises a plunger member 1850 reciprocably mounted with respect to plunger casing 1820, the plunger member 1850 being reciprocably displaceable with respect to the plunger casing 1820 between a nominal first plunger position S1' and a second plunger position S2'. The plunger member 1850 comprises a plunger head 1858 and lower projection 1859.

In this example, plunger member 1850, in particular the plunger head 1858, comprises one or more lateral inlets 1812, outlet openings 1714, 1716, and a fluid venting conduit 1710 providing open fluid communication between the one or more lateral inlets 1812 and outlet openings 1714, 1716.

The plunger head 1858 has an upper end 1852 in selective fluid communication with the conduit 1680, via the lateral inlets 1812. The lower projection 1859 projects out of the plunger casing 1820 and is configured for selective abutment with respect to the first arm 1361 of the coupling plate 1360. The plunger head 1858 further comprises a peripheral wall 1855 facing an inside of the plunger casing 1820. The outlet openings 1714, 1716 are provided on the peripheral wall 1855. The plunger head 1858 can optionally further comprises a one or more ring seals for providing a suitable seal between the plunger head 1858 and the cylinder 1820. The venting arrangement 1800 further comprises a biasing spring 1810 that biases the plunger member 1850, in particular lower projection 1859, in a direction towards the extraction axis EA'.

In position S1' (FIG. 10), the upper end 1852 projects out of the plunger casing 1820 and into the conduit 1680, such as to allow free fluid communication between the lateral inlets 1812 and the conduit 1680 (by thereby exposing the lateral inlets 1812 to the conduit 1680).

In position S2' (FIG. 11), the upper end 1852 is retracted into the plunger casing 1820, effectively sealing off the plunger casing 1820 from the conduit 1680, such as to prevent fluid communication between the lateral inlets 1812 and the conduit 1680 (by thereby blocking the lateral inlets 1812 via the walls of the plunger casing 1820).

In this example, safety system 1700, in particular the venting arrangement 1800, further comprises two plunger casing openings 1814, 1816, provided in the plunger casing 1820, passing through the thickness of the wall of plunger casing 1820. The outside of the plunger casing 1820, in this example, is inside the housing 1110 but still in free fluid communication with the outside environment E. In alternative variations of this example, the outside of the plunger casing 1820, can instead be partially or fully outside the housing 1110 and in any case in free fluid communication with the outside environment E.

The lateral inlets 1812 are located on plunger head 1858, and the plunger casing openings 1814, 1816 are located on the plunger casing 1820, at respective positions such that:

the plunger casing openings 1814, 1816 are in registry with the outlet openings 1714, 1716, respectively, and the lateral inlets 1812 are in fluid communication with the conduit 1680—when safety lock 1799 is concurrently in coupled mode (FIG. 10), so that there is free fluid communication between the external environment E and the conduit 1680, via the lateral inlets 1812, fluid conduit 1710, outlet openings 1714, 1716, and plunger casing openings 1814, 1816;

and the plunger casing openings 1814, 1816 are in not in registry with the outlet openings 1714, 1716, and the lateral inlets 1812 are not in fluid communication with the conduit 1680—when safety lock 1799 is concurrently in uncoupled mode (FIG. 11) so that fluid communication is blocked between the external environment E and the conduit 1680.

Thus, at position S1', and concurrent with the safety lock 1799 being in coupled mode, the safety system 1700 is designed to cope with a design condition in which the pressure within the conduit 1680 begins to increase, for example as a result of the actuation system 1600 being actuated (either by accident or because of a malfunction, for example). In such a design condition, the safety system 1700 provides an escape for the gas pressure, which otherwise (i.e., under alternative conditions in which the safety system 1700 is absent or non-operational) would increase, for example to the actuation pressure AP or greater. The safety system 1700 thus prevents the pressure in the conduit 1680 from reaching the actuation pressure AP and in particular from significantly exceeding the increasing actuation pressure AP, and thus enables the housing 1110 to be designed with a considerably reduces safety margin, as regards capability for holding large internal pressure, as could otherwise be required under such alternative conditions.

It is to be noted that under nominal operating conditions, the safety lock 1799 is uncoupled from the coupled mode to the uncoupled mode prior to take off, for example by ground crew. At that point, the spring 1810 causes the plunger member 1850 to move from position S1' to position S2', thereby freeing the pivoting member 1360 from the pivoting block. At some later point in the mission when it is required to eject the stores 10, the actuation system 1600 is actuated, the pressure within the conduit 1680 increases up to the actuation pressure AP. The piston 1650 moves from position P1' to position P2' responsive to the actuation pressure AP being applied thereto. This is because in the uncoupled mode, the pivoting member 1360 is no longer prevented from pivoting and thus from preventing further displacement of the piston 1650. The actuation pressure AP is sufficient, in the uncoupled mode, to displace the piston 1650 to be fully displaced to position P2', concurrently actuating the lug engagement release system 1300 (by applying a torque thereto via roller 1387 and third arm 1382) to cause the lug engagement release system 1300 to go from engaged configuration to the disengaged configuration. Concurrently, the actuation system 1600 also actuates the ejector system 1500 causing the corresponding telescopic plunger elements to be extended from the respective tubular housings under action of gas pressure provided by the actuation system 1600, thereby providing an ejection force to the stores 10 after this has been disengaged from the device 1100.

On the other hand, and at the aforementioned design condition, shortly after such an event of the actuation system 1600 being actuated while the safety lock 1799 is concurrently in coupled mode, the plunger member 1850 remains at position S1', since displacement to position S2' is prevented by the coupled safety lock 1799, thereby blocking the pivoting member 1360 from the pivoting about the axis 1365.

As pressure within the conduit 1680 increases towards actuation pressure AP the piston 1650 nevertheless remains at position P1 since further displacement of the piston 1650 is resisted by pivoting member 1360, which is prevented from pivoting by abutment of the arm 1361 against the coupled safety lock 1799. However, by the plunger member 1850 remaining at position S1', the fluid venting conduit 1710 allows venting of the pressurized gas from the pressurized source 1690 to the external environment E, and the pressure within the conduit 1680 reduces and eventually settles at around ambient pressure (i.e., the pressure of the external environment E). Accordingly, under such conditions there is insufficient gas pressure within the actuation system 1600 to cause the engagement release system 1300 to go to disengaged configuration, even if the safety lock 1799 is subsequently uncoupled to uncoupled mode. Similarly, under such conditions there is insufficient gas pressure within the actuation system 1600 to cause the telescopic plunger elements of the ejector system 1500 to be extended from the respective tubular housings, thereby avoiding the application of an undesired mechanical load on the stores 10 while still engaged to the device 1100. It is then safe to decouple the safety lock 1799 to uncoupled mode (for example by ground crew, once the air vehicle lands), without risk of the actuation system 1600 actuating the engagement release system 1300 to cause this to go from the engaged configuration to the disengaged configuration. It is also then possible to replace the pressurized gas source 1690 with another pressurized gas source, for example, and to enable the air vehicle to once again resume the mission with the same stores.

Such aforesaid alternative conditions with the safety lock 1799 still being in coupled mode could otherwise result in excessive pressure buildup within the actuator system 1600, which is considered undesirable, and moreover would requires the housing 1110, and in particular the conduit 1680 to be designed to contain such excess pressure over a long period. Furthermore, such alternative conditions of pressure buildup with the with the safety lock 1799 still being in coupled mode can also present a risk element, since subsequent uncoupling of the safety lock 1799 to the uncoupled mode (which typically is carried out by the grounds crew, well before the aircraft takes off) can then cause the stores 10 to be ejected, in particular forcibly ejected, with the aircraft still on the ground, which can have serious or even catastrophic consequences, particularly if the stores 10 is a bomb or a fuel tank, for example.

Furthermore, such alternative conditions of such pressure buildup with the safety lock 1799 still being in coupled mode can also result in a number of procedures having to be implemented to subsequently de-pressurize the conduit 1680 to safe conditions, and to replace the pressurized gas source 1690 with another pressurized gas source, for example.

It is to be noted that in alternative variations of the second example of the presently disclosed subject matter, the safety system 1700 can also incorporate the safety system 1700 of the first example. For example, in the device 1110 illustrated in FIGS. 9, 10, 11, the piston 1650 can optionally further include a fluid conduit having an inlet opening provided at the top face of the piston 1650, and in open fluid communication with outlet openings provided on the peripheral wall 1655 of the piston 1650, for example similar to fluid venting conduit 710, inlet opening 712 provided at the top face 652 of the piston 650, and outlet openings 714, 716, as disclosed herein with reference to the first example, mutatis mutandis. This arrangement also thus provides open fluid communication between inlet opening of the piston 1650 and the conduit 1680, and thus between inlet opening of the piston 1650 and the inlet port 1610, and thus between inlet opening of the piston 1650 and the pressurized gas source 1690. In this variation of the second example, safety system 1700 further comprises two cylinder openings provided in the spaced side plates of the housing 1110, passing through the thickness of each of the spaced side plates, for example similar to the cylinder openings 112, 114 as disclosed herein with reference to the first example, mutatis mutandis.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A support and release device for releasably supporting a store, the store having at least one lug for enabling selective removable engagement of the store with respect to the device, the support and release device comprising:
   a housing accommodating:
      a lug engagement release system, comprising a hook element;
      an actuator system, operatively coupled to the lug engagement release system; and
      a safety system comprising a safety lock, said safety lock being configured for selectively coupling or uncoupling with respect to at least the lug engagement release system to alternately provide a coupled mode and a decoupled mode, respectively,
   wherein:
      the lug engagement release system is configured for alternately providing:
         an engaged configuration, in which the lug engagement release system is capable of being in an engaged relationship with respect to the lug via said hook element, and a disengaged configuration, in which the lug engagement release system is selectively disengaged with respect to the lug, responsive to selective operation of the actuator system wherein the actuator system selectively provides pressurized gas to said lug engagement release system, concurrent with the safety lock being in uncoupled mode;

wherein:

in the coupled mode the safety lock is coupled with respect to the lug engagement release system such as to prevent the lug engagement release system, in the engaged configuration, from providing the disengaged configuration, irrespective of operation of the actuator system; and in the decoupled mode the safety lock is decoupled with respect to the lug engagement release system enabling the lug engagement release system to provide the disengaged configuration from the engaged configuration responsive to operation of the actuator system; and wherein the safety system is configured for enabling venting of the pressurized gas from the actuator system to an external environment under conditions where the actuation system is operated concurrent with the safety lock being in coupled mode;

wherein said actuator system comprises a fluid conduit connectable to a pressurized gas source, the pressurized source configured for providing pressurized gas to said lug engagement release system during operation of said device;

wherein said safety system comprises a venting arrangement configured for providing fluid communication between said fluid conduit and the external environment when the safety lock is in said coupled mode, and to prevent fluid communication between said fluid conduit and the external environment when the safety lock is in uncoupled mode;

wherein said actuator system comprises an actuation piston reciprocably mounted with respect a cylinder, the cylinder being in fluid communication with said fluid conduit, the piston being displaceable with respect to the cylinder responsive to said pressurized gas being applied to the piston and concurrent with the safety lock being in uncoupled mode;

wherein said safety system comprises a venting arrangement comprising at least one fluid venting conduit, each said fluid venting conduit having at least one inlet in selective fluid communication with said fluid conduit, and at least one outlet in selective fluid communication with the external environment;

wherein the respective said fluid venting conduit, the respective said at least one inlet, and the respective at least one outlet are provided in said piston, and wherein said cylinder comprises at least one cylinder opening corresponding to each said outlet.

2. The support and release device according to claim 1, wherein the actuation piston is operatively coupled to the lug engagement release system, such that as the actuation piston is displaced with respect to the cylinder between a first position and a second position, the lug engagement release system goes from the engaged configuration to the disengaged configuration.

3. The support and release device according to claim 1, wherein for at least one said fluid venting conduit, and concurrent with the safety lock being in said coupled mode, the respective said at least one inlet is in free fluid communication with said fluid conduit and at least one outlet is in selective fluid communication with the external environment.

4. The support and release device according to claim 1, including at least one of the following: —wherein said venting arrangement further comprises a plunger member reciprocably mounted with respect to plunger casing, the plunger member being reciprocably displaceable with respect to the plunger casing between a nominal first plunger position and a second plunger position; —wherein said venting arrangement further comprises a plunger member reciprocably mounted with respect to plunger casing, the plunger member being reciprocably displaceable with respect to the plunger casing between a nominal first plunger position and a second plunger position, and, wherein a second said fluid venting conduit, a respective second said at least one inlet, and a respective second at least one outlet are provided in said plunger member, and wherein said plunger casing comprises at least one casing opening corresponding to each said second outlet; —wherein said venting arrangement further comprises a plunger member reciprocably mounted with respect to plunger casing, the plunger member being reciprocably displaceable with respect to the plunger casing between a nominal first plunger position and a second plunger position, and, wherein a second said fluid venting conduit, a respective second said at least one inlet, and a respective second at least one outlet are provided in said plunger member, and wherein said plunger casing comprises at least one casing opening corresponding to each said second outlet, and, wherein said casing openings are located on the plunger casing at respective positions such as to be in registry with said second outlet openings when said plunger member is at or close to said first plunger position thereby providing is free fluid communication between the external environment and the fluid conduit, via the second fluid venting conduit and casing openings; —wherein said venting arrangement further comprises a plunger member reciprocably mounted with respect to plunger casing, the plunger member being reciprocably displaceable with respect to the plunger casing between a nominal first plunger position and a second plunger position, and, wherein a second said fluid venting conduit, a respective second said at least one inlet, and a respective second at least one outlet are provided in said plunger member, and wherein said plunger casing comprises at least one casing opening corresponding to each said second outlet, and, wherein said casing openings are located on the plunger casing at respective positions such as not to be in registry with the second outlet openings when the plunger member has moved significantly away from said first plunger position in a direction towards said second plunger position, and until said second position to thereby block fluid communication between external environment and the second fluid conduit; or —wherein said venting arrangement further comprises a plunger member reciprocably mounted with respect to plunger casing, the plunger member being reciprocably displaceable with respect to the plunger casing between a nominal first plunger position and a second plunger position, and, wherein a second said fluid venting conduit, a respective second said at least one inlet, and a respective second at least one outlet are provided in said plunger member, and wherein said plunger casing comprises at least one casing opening corresponding to each said second outlet, and, wherein said casing openings are located on the plunger casing at respective positions such as to be in registry with said second outlet openings when said plunger member is at or close to said first plunger position thereby providing is free fluid communication between the external environment and the fluid conduit, via the second fluid venting conduit and casing openings, and, wherein said casing openings are located on the plunger casing at respective positions such as not to be in registry with the second outlet openings when the plunger member has moved significantly away from said first plunger position in a direction towards said second plunger position, and until said second position to thereby block fluid communication between external environment and the second fluid conduit.

5. The support and release device according to claim 4, including at least one of the following:
   wherein said plunger member comprises a plunger head and lower projection;
   wherein the venting arrangement further comprises a biasing spring that biases the plunger member in a direction towards an extraction axis of the safety lock;
   wherein in said first plunger position, and an upper end of said plunger member projects out of the plunger casing and into the fluid conduit, such as to allow free fluid communication between the second said inlets and the fluid conduit; or
   wherein in said first plunger position, and an upper end of said plunger member projects out of the plunger casing and into the fluid conduit, such as to allow free fluid communication between the second said inlets and the fluid conduit, and, wherein in said second plunger position, the upper end is retracted into the plunger casing, thereby sealing off the plunger casing from the fluid conduit, and such as to prevent fluid communication between the second said inlets and the fluid conduit.

6. The support and release device according to claim 1, further configured for selectively ejecting forcibly the store therefrom, the device comprising an ejector system comprising at least one ejection module, each ejection module configured for providing an ejection force generated under action of gas pressure provided by the actuation system.

7. The support and release device according to claim 6, each ejection module comprises a tubular housing accommodating a telescopic plunger element comprising an end wall at a first longitudinal end thereof having a small opening, the telescopic plunger element being closed at a second longitudinal end thereof.

8. The support and release device according to claim 7, wherein said second longitudinal end comprises a padded abutment element, configured for abutting against the stores when this is engaged with the device.

9. The support and release device according to claim 1, further comprising at least one sway brace.

10. The support and release device according to claim 1, wherein said lug engaging and releasing mechanism comprises a first kinematic chain and a second kinematic chain.

11. The support and release device according to claim 10, including at least one of the following:
   wherein said first kinematic chain comprises a first stressed link, a coupling plate, a first link, and said hook element;
   wherein said first kinematic chain comprises a first stressed link, a coupling plate, a first link, and said hook element, and, wherein said second kinematic chain comprises an anvil member, a second link, a pivoting member, and a second stressed link; or
   wherein said first kinematic chain comprises a first stressed link, a coupling plate, a first link, and said hook element, and, wherein said second kinematic chain comprises an anvil member, a second link, a pivoting member, and a second stressed link, and, wherein said coupling plate and said anvil member are pivotable mounted to said housing coaxially about a pivot axis.

12. An air vehicle comprising at least one support and release device as defined in claim 1.

13. A method for releasably supporting a store, the store having at least one lug, the method comprising:
   (a) providing at least one of the support and release devices as defined in claim 1; and
   (b) engaging the lug with respect to the lug engagement release system to thereby urge the lug engagement release system to the engaged configuration;
   (c) coupling the safety lock with respect to the device to provide the coupled mode.

14. The method according to claim 13, further comprising:
   (d) decoupling the safety lock with respect to the device to provide the decoupled mode;
   (e) selectively operating the actuator system to thereby actuate said lug engagement release system to enable the lug engagement release system to adopt the disengaged configuration, thereby enabling the lug engagement release system to release the lug therefrom.

15. The support and release device according to claim 1, wherein for the respective at least one said fluid venting conduit, and concurrent with the safety lock being in said uncoupled mode there fluid communication is prevented between said at least one inlet and said fluid conduit.

16. The support and release device according to claim 1, wherein for the respective said at least one said fluid venting conduit, and wherein concurrent with the safety lock being in said uncoupled mode fluid communication is prevented between said at least one outlet and the external environment.

17. The support and release device according to claim 1, wherein said cylinder openings are located on the cylinder at respective positions such as to be in registry with said outlet openings when said piston is at or close to said first position thereby providing is free fluid communication between the external environment and the fluid conduit, via the fluid venting conduit and cylinder openings.

18. The support and release device according to claim 1, wherein said cylinder openings are located on the cylinder at respective positions such as not to be in registry with the outlet openings when the piston has moved significantly away from said first position in a direction towards said second position, and until said second position to thereby block fluid communication between external environment and the fluid conduit.

19. The support and release device according to claim 1, wherein said cylinder openings are located on the cylinder at respective positions such as to be in registry with said outlet openings when said piston is at or close to said first position thereby providing is free fluid communication between the external environment and the fluid conduit, via the fluid venting conduit and cylinder openings, and, wherein said cylinder openings are located on the cylinder at respective positions such as not to be in registry with the outlet openings when the piston has moved significantly away from said first position in a direction towards said second position, and until said second position to thereby block fluid communication between external environment and the fluid conduit.

* * * * *